United States Patent
Li et al.

(10) Patent No.: US 12,476,257 B2
(45) Date of Patent: Nov. 18, 2025

(54) POSITIVE PLATE, ELECTROCHEMICAL DEVICE COMPRISING SAME AND APPARATUS THEREOF

(71) Applicant: CONTEMPORARY AMPEREX TECHNOLOGY (HONG KONG) LIMITED, Hong Kong (CN)

(72) Inventors: Jing Li, Ningde (CN); Qingrui Xue, Ningde (CN); Wei Li, Ningde (CN); Zige Zhang, Ningde (CN); Yang Zhang, Ningde (CN); Xianwei Yang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 923 days.

(21) Appl. No.: 17/620,417

(22) PCT Filed: Dec. 27, 2019

(86) PCT No.: PCT/CN2019/129363
§ 371 (c)(1),
(2) Date: Dec. 17, 2021

(87) PCT Pub. No.: WO2021/000547
PCT Pub. Date: Jan. 7, 2021

(65) Prior Publication Data
US 2022/0352522 A1    Nov. 3, 2022

(30) Foreign Application Priority Data
Jul. 1, 2019 (CN) .......................... 201910585849.2

(51) Int. Cl.
*H01M 4/66* (2006.01)
*H01M 4/02* (2006.01)
(Continued)

(52) U.S. Cl.
CPC ........... *H01M 4/667* (2013.01); *H01M 4/621* (2013.01); *H01M 4/623* (2013.01); *H01M 4/625* (2013.01);
(Continued)

(58) Field of Classification Search
CPC ..................................................... H01M 4/667
See application file for complete search history.

(56) References Cited

U.S. PATENT DOCUMENTS

2005/0221190 A1* 10/2005 Sudano ............... H01M 10/052
429/234
2015/0263333 A1   9/2015 Kinugawa et al.
(Continued)

FOREIGN PATENT DOCUMENTS

| CN | 101960652 A | 1/2011 |
| CN | 104704652 A | 6/2015 |

(Continued)

OTHER PUBLICATIONS

Machine translation of CN 109037592 A (Year: 2018).*
(Continued)

*Primary Examiner* — Robert S Carrico
(74) *Attorney, Agent, or Firm* — K&L Gates LLP

(57) ABSTRACT

Positive plate, electrochemical device including same, and apparatus thereof are disclosed. The positive plate includes a current collector and an electrode active material layer arranged on at least one surface of the current collector, the current collector includes a support layer and a conductive layer arranged on at least one surface of the support layer, a single-sided thickness D2 of the conductive layer satisfies: 30 nm≤D2≤3 μm. A material of the conductive layer is aluminum or aluminum alloy, and a density of the conductive layer is 2.5 g/cm³-2.8 g/cm³. The electrode active material layer includes an electrode active material, a binder,
(Continued)

and a conductive agent, and the binder has an uneven distribution in a thickness direction of the electrode active material layer.

24 Claims, 4 Drawing Sheets

(51) Int. Cl.
*H01M 4/62* (2006.01)
*H01M 10/0525* (2010.01)
*H01M 10/42* (2006.01)

(52) U.S. Cl.
CPC ........... *H01M 4/661* (2013.01); *H01M 4/662* (2013.01); *H01M 4/664* (2013.01); *H01M 10/0525* (2013.01); *H01M 10/4235* (2013.01); *H01M 2004/021* (2013.01); *H01M 2004/028* (2013.01); *H01M 2220/20* (2013.01)

(56) References Cited

U.S. PATENT DOCUMENTS

| | | | | |
|---|---|---|---|---|
| 2016/0285074 | A1* | 9/2016 | Yamafuku | H01M 4/622 |
| 2018/0006289 | A1* | 1/2018 | Seol | H01M 4/667 |

FOREIGN PATENT DOCUMENTS

| | | | |
|---|---|---|---|
| CN | 107732146 | A | 2/2018 |
| CN | 108390066 | A | 8/2018 |
| CN | 109004171 | A | 12/2018 |
| CN | 109037592 | A | 12/2018 |
| CN | 109873161 | A | 6/2019 |
| CN | 109873164 | A | 6/2019 |
| CN | 109873166 | A | 6/2019 |
| JP | 2014207201 | A * | 10/2014 |
| WO | 2014083950 | A1 | 6/2014 |
| WO | 2016067428 | A1 | 5/2016 |
| WO | 2018198738 | A1 | 11/2018 |
| WO | 2021000547 | A1 | 1/2021 |

OTHER PUBLICATIONS

Machine translation of CN 107732146 A (Year: 2018).*
Contemporary Amperex Technology Co., Limited, International Search Report with English Translation, PCT/CN2019/129363, Mar. 26, 2020, 8 pgs.
Contemporary Amperex Technology Co., Limited, CN First Office Action with English Translation, CN201910585849.2, Jun. 4, 2021, 15 pgs.
Contemporary Amperex Technology Co., Limited, Extended European Search Report, EP19936293.0, Mar. 18, 2022, 57 pgs.
First Search Report received in the corresponding Chinese Application 2019105858492, 2 pages.
Notice to Grant Patent Right for Invention received in the corresponding Chinese Application 2019105858492, 1 page.
Notice to Grant a European patent received in the corresponding European Application 19936293.0, 2 pages.
Written Opinion received in the corresponding International Application PCT/CN2019/129363, 4 pages.

* cited by examiner

POSITIVE PLATE, ELECTROCHEMICAL DEVICE COMPRISING SAME AND APPARATUS THEREOF

CROSS REFERENCE TO RELATED APPLICATION

The present application is a continuation of PCT application No. PCT/CN2019/129363, filed on Dec. 27, 2019. The PCT application claims the benefit of priority of Chinese Patent Application No. 201910585849.2, filed on Jul. 1, 2019. Each of the above-referenced applications is incorporated by reference herein in its entirety.

TECHNICAL FIELD

The present application belongs to the field of electrochemical technology. More specifically, the present application relates to a positive plate, an electrochemical device including same and apparatus thereof.

BACKGROUND

Lithium-ion batteries are widely used in electric vehicles and consumer electronic products due to their advantages of high energy density, high output power, long cycle life and low environmental pollution. However, lithium-ion batteries are prone to catch fire or explode when subjected to abnormal conditions such as squeezing, collision, or puncture, causing serious harm. As a result, safety issues of lithium-ion batteries have greatly restricted the application and popularization of lithium-ion batteries.

Although researchers have proposed many methods to improve the safety of batteries, there is still a lack of very effective means for the safety hazards caused by battery punctures. In view of this, it is indeed necessary to provide a battery that can improve the safety of the battery, especially the safety regarding nail penetration.

SUMMARY

An objective of the present application is to provide a battery with improved safety, especially improved safety regarding nail penetration.

A further objective of the present application is to provide a battery with good safety, higher energy density, improved electrochemical performance and other excellent performance.

In a first aspect, the present application relates to a positive plate including a current collector and an electrode active material layer arranged on at least one surface of the current collector.

The current collector includes a support layer and a conductive layer arranged on at least one surface of the support layer, a single-sided thickness D2 of the conductive layer satisfies: 30 nm≤D2≤3 µm, a material of the conductive layer is aluminum or aluminum alloy, a density of the conductive layer is 2.5 g/cm$^3$-2.8 g/cm$^3$.

The electrode active material layer includes an electrode active material, a binder, and a conductive agent, the binder in the electrode active material layer has an uneven distribution in a thickness direction of the electrode active material layer, the electrode active material layer is divided in the thickness direction into an inner region and an outer region, and based on a total weight of the electrode active material layer, a weight percentage of the binder in the inner region of the electrode active material layer is higher than a weight percentage of the binder in the outer region of the electrode active material layer.

In a second aspect, the present application relates to an electrochemical device including a positive plate, a negative plate, a separator, and an electrolytic solution, where the positive plate is the positive plate according to the first aspect of the present application.

In a third aspect, the present application provides an apparatus, including the electrochemical device according to the second aspect of the present application.

The technical solutions of the present application at least have the following advantages.

Firstly, the positive plate of the present application adopts a composite current collector. Since the composite current collector has a thinner conductive layer and the support layer is a polymer material or a polymer composite material, the energy density, such as gravimetric energy density of the electrochemical device can be significantly improved.

Secondly, in the composite current collector adopted in the present application, the conductive layer is a high-density metal layer of aluminum or aluminum alloy (with a density of 2.5 g/cm$^3$-2.8 g/cm$^3$), so that the composite current collector and the positive plate have excellent electrical conductivity and overcurrent capability, thereby enabling the positive plate and electrochemical device of the present application to have very good electrochemical performance.

Thirdly, theoretically, because the composite current collector has a thinner conductive layer, metal burrs produced in abnormal situations such as nail penetration are small; because the composite current collector uses a polymer material or polymer composite material as the support layer, the short-circuit resistance is larger than that of a conventional metal current collector in abnormal situations such as nail penetration. Therefore, the safety performance regarding nail penetration of the electrochemical device of the present application is greatly improved compared to conventional metal current collectors and conventional electrochemical device. However, when the density of the conductive layer is high and/or the thickness D2 of the conductive layer is large, the safety performance regarding nail penetration cannot reach an ideal level. Considering the high density of the material of the conductive layer of the current collector used in the positive plate of the present application, the electrode active material layer is specially designed, so that the binder in the electrode active material layer has an uneven distribution in the thickness direction, and that based on the total weight of the electrode active material layer, the weight percentage of the binder in the inner region of the electrode active material layer is higher than the weight percentage of the binder in the outer region of the electrode active material layer. In this way, in abnormal situations such as nail penetration, the short-circuit resistance can be increased, and the metal burrs that may be generated in the current collector can be effectively wrapped, so as to effectively improve the safety performance regarding nail penetration of the electrochemical device.

Fourthly, since the composite current collector has a higher degree of rebound than conventional metal current collectors, the bond between the current collector and the active material layer is easily broken during the electrode processing and other processes. Therefore, when the binder in the electrode active material layer has an uneven distribution in the thickness direction, and based on the total weight of the electrode active material layer, the weight percentage of the binder in the inner region of the electrode active material layer is higher than the weight percentage of the binder in the outer region of the electrode active material layer, the degree of bonding between the current collector and the active material layer can be increased, so that the electrode including the composite current collector has less polarization and better electrochemical performance.

The apparatus of the present application includes the electrochemical device according to the second aspect of the present application, and therefore has at least the same advantages as the electrochemical device.

Therefore, the positive plate, electrochemical device and apparatus of the present application have good energy density, excellent electrochemical performance, and improved safety performance.

BRIEF DESCRIPTION OF THE DRAWINGS

The positive plate, electrochemical device, apparatus, and advantages of the present application will be described in detail below in conjunction with the drawings and specific embodiments.

Figure 1:
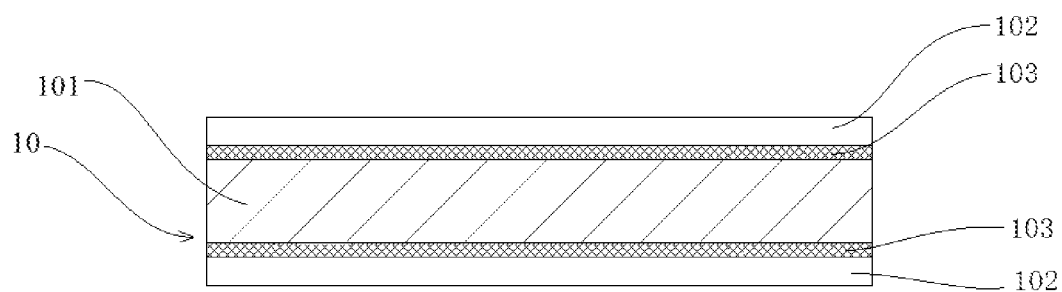
FIG. 1 is a structural schematic diagram of a positive current collector according to a specific embodiment of the present application.

where:
10—current collector (i.e., positive current collector).
101—support layer (i.e., positive support layer).
102—conductive layer (i.e., positive conductive layer).
103—protective layer (i.e., positive protective layer).
11—electrode active material layer (i.e., positive active material layer).
1—battery pack.
2—upper box.
3—lower box.
4—battery module.
5—electrochemical device.

DETAILED DESCRIPTION

The present application is further elaborated below in conjunction with specific embodiments. It is to be understood that these embodiments are merely illustrative of the present application and are not intended to limit the scope of the present application.

A large number of experimental results show that the short circuit within the battery is the root cause of the safety hazards of lithium-ion batteries. The root cause of the short circuit in the battery lies in the electrical connection between the positive plate and the negative plate inside the battery. In abnormal situations such as nail penetration, the direct contact of metal burrs (usually Al metal burrs) produced in the positive plate with the negative plate may cause a short circuit in the battery. It is found that it is feasible to effectively cover (or wrap) the metal burrs of the positive plate by adopting a composite current collector in combination with the coating design of the positive plate, thereby preventing the short circuit in the battery and the resulting thermal runaway of the battery.

The present application discloses a positive plate including a current collector and an electrode active material layer arranged on at least one surface of the current collector.

The current collector includes a support layer and a conductive layer arranged on at least one surface of the support layer. A single-sided thickness D2 of the conductive layer satisfies: 30 nm≤D2≤3 µm. A material of the conductive layer is aluminum or aluminum alloy. A density of the conductive layer is 2.5 g/cm$^3$-2.8 g/cm$^3$.

The electrode active material layer includes an electrode active material, a binder, and a conductive agent. The binder in the electrode active material layer has an uneven distribution in a thickness direction of the electrode active material layer. The electrode active material layer is divided in the thickness direction into an inner region and an outer region. Based on the total weight of the electrode active material layer, the weight percentage of the binder in the inner region of the electrode active material layer is higher than the weight percentage of the binder in the outer region of the electrode active material layer.

The current collector of the positive plate of the present application is a composite current collector. Structurally, the current collector includes a support layer and a conductive layer arranged on at least one surface of the support layer. A single-sided thickness D2 of the conductive layer satisfies: 30 nm≤D2≤3 µm. Therefore, the conductive layer in the current collector provides an electricity conducting function. The thickness D2 of the conductive layer is far less than the thickness of a metal current collector such as Al foil commonly used in the existing technology (the thickness of commonly used Al foil is usually 12 µm), so the mass energy density and volume energy density of the electrochemical device (such as a lithium battery) using the positive plate can be improved. In addition, the composite current collector can also greatly improve the safety performance regarding nail penetration of the electrode. This is because the composite current collector has a thinner conductive layer, so metal burrs produced in abnormal situations such as nail penetration are small. And the composite current collector uses a polymer material or polymer composite material as the support layer, so the short-circuit resistance is larger than that of a conventional metal current collector in abnormal situations such as nail penetration. These factors work together to greatly improve the safety performance regarding nail penetration of the electrochemical device.

It is found that a conductive layer with high density and few defects can be obtained by improving the preparation process of the conductive layer, and the density of the conductive layer has a significant impact on the electrical properties of the current collector and the electrode. Taking a positive plate current collector as an example, aluminum or aluminum alloy is usually used as the conductive layer of the current collector. When the density of the conductive layer is lower than 2.5 g/cm$^3$, the performance of the conductive layer is unstable, and it is easy to be damaged during processing, which may seriously affect the conductivity of the conductive layer, resulting in poor electrical conductivity and overcurrent capability of the current collector and the positive plate. In order to improve the electrical properties of the composite current collector, the conditions of the preparation process of the conductive layer (such as vacuum level, atmosphere, humidity, temperature, etc.) can be adjusted to make the density of the conductive layer of the composite positive current collector higher than 2.5 g/cm$^3$, thereby obtaining a composite current collector having a high-density conductive layer, and allowing for the processing and manufacture of a positive plate with excellent overcurrent capability and excellent electrical conductivity. The density of the conductive layer of the composite positive current collector used in the present application can reach 2.5 g/cm$^3$-2.8 g/cm$^3$.

However, the increase in the density of the conductive layer poses new challenges to the safety of electrode plate and electrochemical device. It has been found that the increase in the density of the conductive layer is not conducive to the safety regarding nail penetration of the electrode plate and the electrochemical device. Therefore, in the positive plate of the present application, the binder in the electrode active material layer has an uneven distribution in the thickness direction, and based on the total weight of the electrode active material layer, the weight percentage of the binder in the inner region of the electrode active material layer is higher than the weight percentage of the binder in the outer region of the electrode active material layer. In this way, in abnormal situations such as nail penetration, the short-circuit resistance can be increased, and the metal burrs that may be generated in the current collector can be effectively wrapped, so as to effectively improve the safety performance regarding nail penetration of the electrochemical device. In addition, since the composite current collector has a higher degree of rebound than conventional metal current collectors, the bond between the current collector and the active material layer is easily broken during the electrode processing and other processes. Therefore, when the binder in the electrode active material layer has an uneven distribution in the thickness direction, and based on the total weight of the electrode active material layer, the weight percentage of the binder in the inner region of the electrode active material layer is higher than the weight percentage of the binder in the outer region of the electrode active material layer, the degree of bonding between the current collector and the active material layer can be increased, so that the electrode plate including the composite current collector has less polarization and better electrochemical performance.

The structure, materials, and performance of the positive plate (and the current collector therein), the electrochemical device, and the apparatus involved in the embodiments of the present application will be described in detail below.

Conductive Layer of Current Collector

Compared with conventional metal current collectors, in the current collector of the embodiments of the present application, the conductive layer provides electricity conducting and current collection functions, and is configured to provide electrons to the electrode active material layer. The material of the conductive layer is selected from aluminum or aluminum alloy.

Poor electrical conductivity or an excessively small thickness of the conductive layer leads to a large internal resistance and great polarization of the battery. An excessively large thickness of the conductive layer is insufficient to improve the gravimetric energy density and volume energy density of the battery, and is not conducive to the improvement of the safety performance regarding nail penetration of the battery.

The single-sided thickness of the conductive layer is D2. D2 satisfies: 30 nm≤D2≤3 µm, more preferably 300 nm≤D2≤2 µm, most preferably 500 nm≤D2≤1.5 µm, in order to better ensure the lightweight performance and good electrical conductivity of the current collector.

In a preferred embodiment of the present application, an upper limit of the single-sided thickness D2 of the conductive layer may be 3 µm, 2.5 µm, 2 µm, 1.8 µm, 1.5 µm, 1.2 µm, 1 µm, or 900 nm; a lower limit of the single-sided thickness D2 of the conductive layer may be 800 nm, 700 nm, 600 nm, 500 nm, 450 nm, 400 nm, 350 nm, 300 nm, 100 nm, 50 nm, or 30 nm; and the range of the single-sided thickness D2 of the conductive layer may be composed of any value of the upper or lower limit. Preferably, 300 nm≤D2≤2 µm; more preferably 500 nm≤D2≤1.5 µm.

In order to obtain a positive plate with excellent electrochemical performance, the density of the conductive layer is 2.5 g/cm$^3$-2.8 g/cm$^3$. A density less than the lower limit indicates poor conductivity of the conductive layer, which may cause a poor overcurrent capability of the current collector and the positive plate. In addition, a density less than the lower limit indicates that the formed conductive layer has poor quality, is unstable, and is easy to be damaged, which also seriously affects the electrical conductivity and overcurrent capability of the current collector and the electrode. Therefore, when the density of the conductive layer is 2.5 g/cm$^3$-2.8 g/cm$^3$, the positive plate and electrochemical device of the present application can have good electrochemical performance.

It should be noted that due to the influence of the processing technology, the density of the conductive layer in the present application may not be the same as the bulk density (actual density) of the material used to prepare the conductive layer. A method for testing the density of the conductive layer in the present application is as follows.

The density of the conductive layer may be measured using a method known in existing technology. As an example, a positive current collector with an area of 10 cm$^2$ is cut and weighed with a balance accurate to 0.0001 g to obtain its mass $m_1$, which is measured in g. And thicknesses of the positive current collector at 20 positions are measured by using a tenthousandth micrometer, and averaged to obtain a mean $d_1$, which is measured in µm. A weighed positive current collector is soaked with 1 mol/L aqueous NaOH solution for 1 min. After the conductive layer is completely dissolved, the support layer is taken out, rinsed with deionized water for 5 times, baked at 100° C. for 20 min, and weighed with the same balance to obtain its mass $m_2$ which is measured in g. Thicknesses of the positive current collector at 20 positions are measured using the same micrometer and averaged to obtain a mean $d_2$ which is measured in μm. The density of the conductive layer is calculated according to the following formula, which is measured in g/cm³.

$$\text{density of conductive layer} = \frac{(m_1 - m_2)}{(d_1 - d_2)/1000}$$

During the measurement, five positive current collectors of the same size are taken, for which the density of the conductive layer is tested, and the results are averaged.

Due to its small thickness, the conductive layer in the present application tends to crack or otherwise damaged during the electrode preparation. Generally, cracks exist in the conductive layer of the electrode in the present application. The cracks in the conductive layer usually exist irregularly in the conductive layer, and may be elongated cracks, cross-shaped cracks, radiating cracks, cracks running through the entire conductive layer, or cracks formed on the surface layer of the conductive layer. The formation of cracks in the conductive layer is usually caused by rolling during the electrode processing, excessive vibration in electrode tab welding, and excessive tension of substrate winding.

The conductive layer may be formed on the support layer by at least one of mechanical rolling, adhesion, vapor deposition, electroless plating, or electroplating. The vapor deposition is preferably physical vapor deposition (PVD). The physical vapor deposition is preferably at least one of evaporation or sputtering. The evaporation is preferably at least one of vacuum evaporating, thermal evaporation deposition, or electron beam evaporation method (EBEM). The sputtering method is preferably magnetron sputtering.

At least one of vapor deposition, electroplating, or electroless plating is preferred to make the bonding between the support layer and the conductive layer stronger.

Support Layer of Current Collector

In the current collector of the embodiments of the present application, the support layer supports and protects the conductive layer. Since the support layer is generally made of an organic polymer material or polymer composite material, the density of the support layer is usually less than the density of the conductive layer, so that the gravimetric energy density of the battery can be significantly increased compared to conventional metal current collectors.

In addition, a metal layer with a small thickness is used as the metal layer, which can further increase the gravimetric energy density of the battery. In addition, since the support layer can well support and protect the conductive layer on its surface, the electrode plate fracture phenomenon commonly seen in conventional current collectors is less likely to occur.

The material of the support layer is selected from at least one of an insulating polymer material, an insulating polymer composite material, a conductive polymer material, or a conductive polymer composite material.

The insulating polymer material is, for example, selected from at least one of polyamide, polyterephthalate, polyimide, polyethylene, polypropylene, polystyrene, polyvinyl chloride, aramid, polyphenylene diamide, acrylonitrile-butadiene-styrene copolymer, polybutylene terephthalate, polyparaphenylene terephthalamide, poly(propylene-ethylene) (PPE), polyoxymethylene, epoxy resin, phenolic resin, polytetrafluoroethylene, polyphenylene sulfide, polyvinylidene fluoride, silicone rubber, polycarbonate, cellulose and its derivatives, starch and its derivatives, protein and its derivatives, polyvinyl alcohol and its cross-linked products, or polyethylene glycol and its cross-linked products.

The insulating polymer composite material is, for example, selected from a composite material formed of an insulating polymer material and an inorganic material, and the inorganic material is preferably at least one of a ceramic material, a glass material, or a ceramic composite material.

The conductive polymer material is, for example, selected from at least one of poly(sulfur nitride)-based polymer materials or doped conjugated polymer materials, such as polypyrrole, polyacetylene, polyaniline, or polythiophene.

The conductive polymer composite material is, for example, selected from a composite material formed of an insulating polymer material and a conductive material. Herein the conductive material is selected from at least one of a conductive carbon material, a metal material, and a composite conductive material. Herein the conductive carbon material is selected from at least one of carbon black, carbon nanotubes, graphite, acetylene black, or graphene. The metal material is selected from at least one of nickel, iron, copper, aluminum or alloys of the foregoing metals. The composite conductive material is selected from at least one of nickel-coated graphite powder or nickel-coated carbon fibers.

According to the actual needs of the application environment, costs and other factors, those skilled in the art can reasonably select and determine the material of the support layer. The material of the support layer in the present application is preferably an insulating polymer material or an insulating polymer composite material, especially when the current collector is a positive current collector.

When the current collector is a positive current collector, the safety performance of the battery can be significantly improved by using a composite current collector having an insulating layer providing a support function and a conductive layer with a specific thickness. Because the insulating layer is non-conductive, its resistance is relatively large, which can increase the short-circuit resistance of the battery when a short circuit occurs in abnormal situations, and greatly reduce the short-circuit current, so that heat generated by the short circuit can be greatly reduced, thereby improving the safety performance of the battery. In addition, the conductive layer is relatively thin, so in abnormal situations such as nail penetration, the local electricity conducting network is cut off, to prevent a large area of the electrochemical device or even the entire electrochemical device from internal short-circuiting. In this way, the damage of the electrochemical device caused by nail penetration is limited to the nail penetration site, i.e., only a "point open circuit" is formed, and the normal operation of the electrochemical device within a certain period of time is not affected.

The thickness of the support layer is D1. D1 preferably satisfies: 1 μm≤D1≤20 μm; more preferably 1 μm≤D1≤15 μm. More preferably, 2 μm≤D1≤10 μm.

If the support layer is too thin, the mechanical strength of the support layer may be insufficient, making it easy to be broken during the electrode processing and other processes; if the support layer is too thick, the volume energy density of the battery using the current collector will be reduced.

An upper limit of the thickness D1 of the support layer may be 20 μm, 15 μm, 12 μm, 10 μm, or 8 μm; a lower limit of the thickness D1 may be 1 μm, 1.5 μm, 2 μm, 3 μm, 4 μm, 5 μm, 6 μm, or 7 μm; the range of the thickness D1 of the support layer may be composed of any value of the upper or lower limit. Preferably, 1 μ≤D1≤15 μm; more preferably 2 μm≤D1≤10 μm; most preferably 3 μm≤D1≤8 μm.

Furthermore, the specific thickness of the conductive layer in the present application can further ensure that the current collector has a large resistance, which can significantly reduce the temperature rise of the battery when an internal short circuit occurs. The conductive layer made of aluminum or aluminum alloy can further significantly reduce or prevent the thermite reaction of the positive current collector, so as to ensure that the battery has good safety performance.

In addition, when the conductive layer is a metal conductive layer, preferably a normal temperature Young's modulus of the support layer satisfies: 20 GPa≥E≥4 GPa.

A method for testing the normal temperature Young's modulus of the support layer in the present application is as follows.

A support layer sample is cut into 15 mm×200 mm, the thickness h(μm) of which is measured using a tenthousandth micrometer. A tensile test is conducted under normal temperature and pressure using a high-speed universal tensile testing machine. An initial position is set, and the sample between clamps is made 50 mm long. Stretching is carried out at a speed of 50 mm/min, and a load L(N) and the machine's displacement y(mm) are recorded when the sample is broken due to stretching. Then the stress $\varepsilon$=L/(15*h)*1000, and the strain $\eta$=y/50*100. A stress-strain curve is drawn, and an initial linear region curve is selected. The slope of the curve is Young's modulus E.

Metals are more rigid than polymer or polymer composite materials, that is, the metals undergo a smaller deformation during the rolling process of electrode processing, so in order to ensure that the deformation difference between the support layer and the conductive layer is not too large to tear the conductive layer, the normal temperature Young's modulus of the support layer should preferably satisfy: 20 Gpa≥E≥1.9 Gpa, preferably 20 Gpa≥E≥4 Gpa, so that the support layer can have a certain rigidity to better match the rigidity of the conductive layer, to ensure that the deformation difference between the support layer and the conductive layer may not be too large during the processing of the current collector and the electrode.

Since the support layer has a certain rigidity (20 Gpa≥E≥4 Gpa), the current collector is not easy to deform or stretch too much during the processing of the current collector and the electrode, so that the support layer and the conductive layer can be firmly bonded and do not easily detach from each other, which can prevent the conductive layer from being "forced" to stretch and cause damage to the conductive layer. In addition, the current collector according to the present application has a certain degree of toughness, so that the current collector and the electrode have a certain ability to withstand deformation and are not easy to break.

However, the Young's modulus of the support layer cannot be too large, otherwise the rigidity may be too strong, making it difficult to reel and wind and leading to poor workability. When 20 Gpa≥E, the support layer can be guaranteed to have a certain degree of flexibility, and the electrode plate can also have a certain ability to withstand deformation.

In addition, preferably the thermal shrinkage rate of the support layer at 90° C. is not greater than 1.5%, so that the thermal stability of the current collector can be better ensured during the electrode processing.

The elongation at break B of the support layer is 12% or more, preferably 15% or more, and more preferably 30% or more. When an abnormal situation such as nail penetration occurs in the lithium-ion battery, the burrs of the support layer can effectively cover the burrs of the conductive layer, thereby improving the safety performance regarding nail penetration of lithium-ion battery. In particular, the ductility of the support layer is significantly greater than that of the conductive layer. In this case, when an abnormal situation such as nail penetration occurs in the lithium-ion battery, the conductive layer is forced to stretch, and the support layer covers the surface of the nail and separates the nail from the conductive layers, to better cut off the local electricity conducting network. In this way, the damage of the lithium-ion battery caused by nail penetration or the like is limited to the nail penetration site, i.e., only a "point open circuit" is formed, and the normal operation of the lithium-ion battery within a certain period of time is not affected.

The elongation at break B of the support layer is 10000% or less, preferably 400% or less, so that the support layer can well support and protect the conductive layer, to ensure the overall strength of the positive current collector.

The elongation at break B of the support layer can be measured by a method known in the existing technology. As an example, the support layer is cut into a 15 mm×200 mm sample. A tensile test is conducted under normal temperature and pressure (25° C., 0.1 MPa) using a high-speed universal tensile testing machine. An initial position is set, and the sample between clamps is made 50 mm long. Stretching is carried out at a speed of 50 mm/min, and the machine's displacement y(mm) is recorded when the sample is broken due to stretching. Finally the elongation at break is calculated: B=(y/50)×100%.

The volume resistivity of the support layer is the volume resistivity at 20° C., which can be measured by a method known in the existing technology. As an example, the test is carried out in a constant temperature, normal pressure and low humidity room (20° C., 0.1 MPa, RH≤20%), and a round sample of the support layer with a diameter of 20 mm is prepared (where the sample size can be adjusted according to the actual size of the test instrument). The test adopts a method of measuring the surface resistivity using three electrodes (GB T 1410-2006), and is carried out using an insulation resistance tester (precise to 10Ω). The test method is as follows: The round sample is placed between two electrodes and a potential difference is applied between the two electrodes. The current generated will be distributed in the body of the round sample and measured by a picoammeter or electrometer, so as to avoid the measurement error caused by including the surface leakage current in the measurement. The reading is the volume resistivity which is measured in Ω•m.

The material of the support layer in the present application is preferably an insulating polymer material or an insulating polymer composite material to better improve the safety performance regarding nail penetration of the battery.

Protective Layer of Current Collector

In some preferred embodiments of the present application, a protective layer is further arranged on a surface of the current collector, and the protective layer is arranged on only one surface or two surfaces of the conductive layer of the current collector, that is, a surface of the conductive layer facing away from the support layer and a surface of the conductive layer facing the support layer.

The protective layer may be a metal protective layer or a metal oxide protective layer. The protective layer can prevent the conductive layer of the current collector from being damaged by chemical corrosion or mechanical damage, and can also enhance the mechanical strength of the current collector, thereby improving the overcurrent capability and electrochemical performance of the current collector and the electrode plate.

Preferably, the protective layer is arranged on each of two surfaces of the conductive layer of the current collector. The lower protective layer of the conductive layer (i.e., the protective layer arranged on the surface of the conductive layer facing the support layer) not only can prevent damage to the conductive layer and enhance the mechanical strength of the current collector, but also can enhance the bonding force between the support layer and the conductive layer to prevent peeling (i.e., separation of the support layer and the conductive layer).

The technical effect of the upper protective layer of the conductive layer (i.e., the protective layer arranged on the surface of the conductive layer facing away from the support layer) is mainly to prevent the conductive layer from being damaged or corroded during processing (for example, immersion in electrolytic solution, rolling, and the like all have impact on the surface of the conductive layer).

Due to the good conductivity, the metal protective layer can not only further improve the mechanical strength and corrosion resistance of the conductive layer, but also reduce the polarization of the electrode plate. The material of the metal protective layer is, for example, selected from at least one of nickel, chromium, nickel-based alloy, or copper-based alloy, preferably nickel or nickel-based alloy.

The nickel-based alloy is an alloy formed by adding one or more other elements to pure nickel as the matrix. Preferably, the material of the metal protective layer is a nickel-chromium alloy. The nickel-chromium alloy is an alloy formed of metallic nickel and metallic chromium. Optionally, the molar ratio of nickel to chromium is 1:99-99:1.

The copper-based alloy is an alloy formed by adding one or more other elements to pure copper as the matrix. Preferably, the material of the metal protective layer is a copper-nickel alloy. Optionally, in the copper-nickel alloy, the molar ratio of nickel to copper is 1:99-99:1.

When the protective layer is made of a metal oxide, the metal oxide which has a low ductility, large specific surface area, and high hardness can also effectively support and protect the conductive layer, and improve the bonding force between the support layer and the conductive layer. The material of the metal oxide protective layer is, for example, selected from at least one of aluminum oxide, cobalt oxide, chromium oxide, or nickel oxide.

According to the present application, the protective layer of the positive plate composite current collector preferably adopts a metal oxide, so as to further improve the safety performance of the positive plate and the battery while achieving a good support and protection effect.

The thickness of the protective layer is D3, and D3 preferably satisfies: $D3 \leq \frac{1}{10} D2$ and 1 nm$\leq$D3$\leq$200 nm. If the protective layer is too thin, it is insufficient to protect the conductive layer; if the protective layer is too thick, it will reduce the gravimetric energy density and volume energy density of the battery. More preferably, 5 nm$\leq$D3$\leq$500 nm, further preferably 10 nm$\leq$D3$\leq$200 nm, and most preferably 10 nm$\leq$D3$\leq$50 nm.

The protective layers on the two surfaces of the conductive layer may be of the same or different materials, and may have the same or different thicknesses. Preferably, the upper protective layer and the lower protective layer are both metal oxide protective layers.

Preferably, the thickness of the lower protective layer is less than the thickness of the upper protective layer, so as to help improve the gravimetric energy density of the battery.

The thickness of the upper protective layer is $D_a$, 1 nm$\leq$$D_a$$\leq$200 nm, and $D_a$$\leq$0.1 D2; the thickness of the lower protective layer is $D_b$, 1 nm$\leq$$D_b$$\leq$200 nm, and Db$\leq$0.1 D2; $D_a$>$D_b$, preferably, 0.5 $D_a$$\leq$$D_b$$\leq$0.8 $D_a$.

For the positive current collector, aluminum or aluminum alloy is used as the material of the conductive layer, and the lower protective layer is preferably a metal oxide material. Compared with the choice of metal for the material of the lower protective layer, the metal oxide material has a larger resistance. Therefore, this type of lower protective layer can further increase the resistance of the positive current collector to a certain extent, to further increase the short-circuit resistance of the battery in the event of a short circuit, thereby improving the safety performance of the battery. In addition, since the metal oxide has a larger specific surface area, the bonding force between the lower protective layer of the metal oxide material and the support layer is enhanced, and the lower protective layer can increase the surface roughness of the support layer to enhance the bonding force between the conductive layer and the support layer, thereby improving the overall strength of the current collector.

Structure of Current Collector

FIG. 1 to FIG. 4 are structural schematic diagrams of a current collector used in a positive plate according to some specific embodiments of the present application.

In FIG. 1, the positive current collector 10 includes a positive current collector support layer 101 and positive current collector conductive layers 102 respectively arranged on two opposite surfaces of the positive current collector support layer 101, and further includes a positive current collector protective layer 103 arranged on a lower surface (i.e., the surface facing the positive current collector support layer 101) of each of the positive current collector conductive layers 102.

Figure 2:
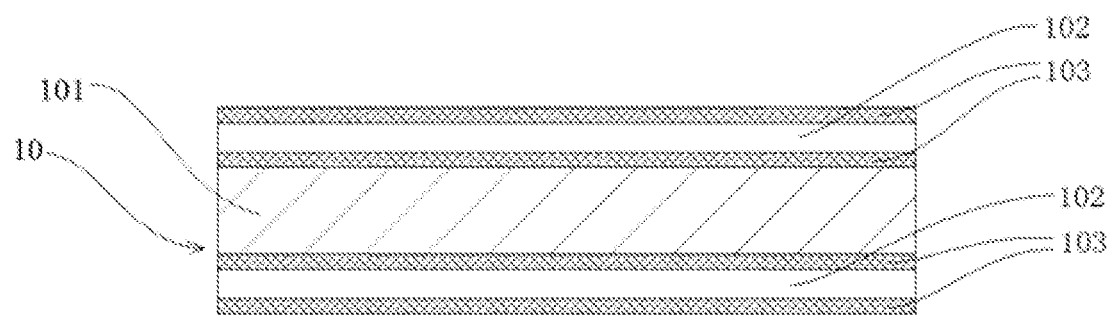
FIG. 2 is a structural schematic diagram of a positive current collector according to another specific embodiment of the present application.

In FIG. 2, the positive current collector 10 includes a positive current collector support layer 101 and positive current collector conductive layers 102 respectively arranged on two opposite surfaces of the positive current collector support layer 101, and further includes positive current collector protective layers 103, i.e., a lower protective layer and an upper protective layer, which are respectively arranged on two opposite surfaces of each of the positive current collector conductive layers 102.

Figure 3:
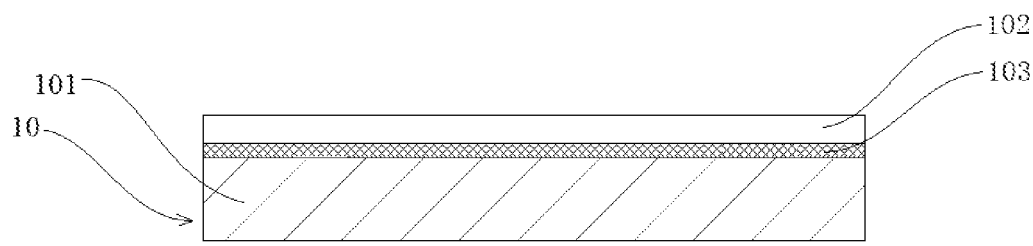
FIG. 3 is a structural schematic diagram of a positive current collector according to another specific embodiment of the present application.

In FIG. 3, the positive current collector 10 includes a positive current collector support layer 101 and a positive current collector conductive layer 102 arranged on one surface of the positive current collector support layer 101, and further includes a positive current collector protective layer 103, i.e., a lower protective layer, which is arranged on a surface of the positive current collector conductive layer 102 facing the positive current collector support layer 101.

Figure 4:
FIG. 4 is a structural schematic diagram of a positive current collector according to another specific embodiment of the present application.

In FIG. 4, the positive current collector 10 includes a positive current collector support layer 101 and a positive current collector conductive layer 102 arranged on one surface of the positive current collector support layer 101, and further includes positive current collector protective layers 103, i.e., a lower protective layer and an upper protective layer, which are respectively arranged on two opposite surfaces of the positive current collector conductive layer 102.

The protective layers on the two opposite surfaces of the conductive layer may be of the same or different materials, and may have the same or different thicknesses.

For the current collector used in the positive plate according to the present application, a conductive layer may be arranged on each of the two opposite surfaces of the support layer, as shown in FIG. 1 and FIG. 2, or, a conductive layer may be arranged on only one surface of the support layer, as shown in FIG. 3 and FIG. 4. It should be understood that although FIG. 3 and FIG. 4 show only the lower protective layer, it is also feasible to form only the upper protective layer on the surface of the conductive layer.

In addition, although the composite current collector used in the positive plate of the present application preferably includes a current collector protective layer as shown in FIG. 1 to FIG. 4, it should be understood that the current collector protective layer is not a necessary structure in the current collector. In some embodiments, the current collector used may include no current collector protective layer.

Electrode Active Material Layer of Positive Plate

The electrode active material layer used in the positive plate of the present application may be nay conventional electrode active material layer commonly used in the existing technology, and the composition and preparation method thereof are well-known in the existing technology. The electrode active material layer generally includes an electrode active material, a binder, and a conductive agent. The electrode active material layer may include another optional additive or auxiliary agent as required.

For the positive plate of the present application, various electrode active materials commonly used in the existing technology (i.e., positive active materials) may be used. For example, for lithium-ion batteries, the positive active material may be selected from lithium cobalt oxide, lithium nickel oxide, lithium manganese oxide, lithium nickel manganese oxide, lithium nickel cobalt manganese oxide, lithium nickel cobalt aluminum oxide, transition metal phosphate, lithium iron phosphate, or the like. However, the present application is not limited to these materials, and other conventionally known materials that can be used as positive active materials of lithium-ion batteries can also be used. These positive active materials may be used alone or in combination. Preferably, the positive active material may be selected from one or more of $LiCoO_2$, $LiNiO_2$, $LiMnO_2$, $LiMn_2O_4$, $LiNi_{1/3}Co_{1/3}Mn_{1/3}O_2$ (NCM 333), $LiNi_{0.5}Co_{0.2}Mn_{0.3}O_2$ (NCM 523), $LiNi_{0.6}Co_{0.2}Mn_{0.2}O_2$ (NCM 622), $LiNi_{0.8}Co_{0.1}Mn_{0.1}O_2$ (NCM811), $LiNi_{0.85}Co_{0.15}Al_{0.05}O_2$, $LiFePO_4$, or $LiMnPO_4$.

For the positive plate of the present application, preferably the average particle size D50 of the active material in the electrode active material layer is 5-15 μm. If D50 is too small, the porosity of the plate after compaction is small, which is not conducive to the infiltration of the electrolytic solution, and the large specific surface area of the plate is likely to cause more side reactions with the electrolytic solution, lowering the reliability of the electrode assembly; if D50 is too large, it is likely to cause great damage to the primer coating of the adhesive layer and the composite current collector during the plate compaction process. D50 refers to the particle size corresponding to a cumulative volume percentage of the active material reaching 50%, that is, the median particle size of the volume distribution. D50 may be measured using, for example, a laser diffraction particle size distribution measuring instrument (for example, Malvern Mastersizer 3000).

For the positive plate of the present application, various conductive agents, binders or other optional additives or auxiliary agents commonly used in the existing technology may be used.

The conductive agent in the electrode active material layer may be at least one of a conductive carbon material or a metal material. Herein the conductive carbon material is selected from at least one of zero-dimensional conductive carbon, such as acetylene black or conductive carbon black; one-dimensional conductive carbon, such as carbon nanotubes; two-dimensional conductive carbon, such as conductive graphite or graphene; or three-dimensional conductive carbon, such as reduced graphene oxide. The metal material is selected from at least one of aluminum powder, iron powder, or silver powder.

The binder in the electrode active material layer may be selected from at least one of styrene-butadiene rubber, oily polyvinylidene fluoride (PVDF), polyvinylidene fluoride copolymer (including PVDF-HFP copolymer and PVDF-TFE copolymer), sodium carboxymethyl cellulose, polystyrene ethylene, polyacrylic acid, polytetrafluoroethylene, polyacrylonitrile, polyimide, aqueous PVDF, polyurethane, polyvinyl alcohol, polyacrylate, polyacrylic acid-polyacrylonitrile copolymer, or polyacrylate-polyacrylonitrile copolymer.

An important feature of the positive plate of the present application is that the binder in the electrode active material layer has an uneven distribution in the thickness direction, that is, the weight percentage of the binder in the electrode active material layer is uneven and variable in the thickness direction. More specifically, based on the total weight of the electrode active material layer, the weight percentage of the binder in the inner region of the electrode active material layer (also referred to as "lower electrode active material layer") is higher than the weight percentage of the binder in the outer region of the electrode active material layer (also called "upper electrode active material layer"). Preferably, the weight percentage of the electrochemically active material in the inner region is lower than the weight percentage of the electrochemically active material in the outer region.

In the present application, the "inner (side)" of the electrode active material refers to the side of the electrode active material layer close to the current collector in the thickness direction; the "outer (side)" of the electrode active material refers to the side of the electrode active material layer away from the current collector in the thickness direction.

"The binder has an uneven distribution in the thickness direction" and "the weight percentage of the binder in the inner region of the electrode active material layer is higher than the weight percentage of the binder in the outer region of the electrode active material layer" can have many different implementations. For example, the weight percentage of the binder in the electrode active material layer may gradually decrease along the thickness direction from the inner region to the outer region; or the electrode active material layer is divided into two or more regions (i.e., divided into two, three or more layers) in the thickness direction, and the weight percentage of the binder in the region closest to the current collector is greater than the weight percentage of the binder in any region far away from the current collector. In a specific embodiment of the present application, the electrode active material layer is divided into two regions (i.e., divided into two electrode active material layers) in the thickness direction, and the weight percentage of the binder in the lower (inner) electrode active material layer is greater than the weight percentage of the binder in the upper (outer) electrode active material layer.

The binder in the inner region is preferably an aqueous binder, for example, at least one of aqueous PVDF, polyacrylic acid, polyurethane, polyvinyl alcohol, polyacrylate, polyacrylic acid-polyacrylonitrile copolymer, or polyacrylate-polyacrylonitrile copolymer. In this way, the increase in DCR of the electrochemical device is small. In the present application, an "aqueous" polymer material means that the polymer molecular chain is fully extended and dispersed in water, and an "oily" polymer material means that the polymer molecular chain is fully extended and dispersed in an oily solvent. Those skilled in the art should understand that by using suitable surfactants, the same type of polymer material may be dispersed in water and oil respectively, that is, by using suitable surfactants, the same type of polymer material may be made into an aqueous polymer material and an oily polymer material respectively. For example, those skilled in the art may modify PVDF into aqueous PVDF or oily PVDF as needed.

Preferably, the conductive agent in the inner region includes a one-dimensional conductive carbon material and/or a two-dimensional conductive carbon material. The one-dimensional conductive material is, for example, one-dimensional conductive carbon (such as carbon nanotubes), and the two-dimensional conductive material is, for example, two-dimensional conductive carbon (such as flake conductive graphite or graphene).

After the addition of the two-dimensional conductive carbon material, during the compaction of the electrode plate, the two-dimensional conductive carbon material in the inner region may undergo "horizontal sliding", which provides a buffering effect to reduce the damage to the conductive layer of the current collector during the compaction process, thereby reducing cracks. A preferred particle size D50 of the two-dimensional conductive carbon material is 0.01-0.1 µm. Preferably, the two-dimensional conductive carbon material accounts for 1 wt %-50 wt % of the conductive material.

The one-dimensional conductive material has a special morphology, and therefore can improve the conductivity of the inner region. Especially when the amount of conductive material added is certain, the one-dimensional conductive material can better improve the electrical conductivity of the primer coating of the adhesive layer than other types of conductive materials. Preferably, carbon nanotubes have a length-to-diameter ratio of 1000-5000.

In a preferred embodiment, the conductive agent in the inner region includes a one-dimensional conductive material and/or a two-dimensional conductive carbon material.

Preferably, the one-dimensional conductive material and/or the two-dimensional conductive carbon material accounts for 1 wt %-50 wt % of the conductive agent in the inner region.

In another preferred embodiment, the conductive agent in the inner region is a combination of a one-dimensional conductive carbon material and a zero-dimensional conductive carbon material. One-dimensional carbon (such as carbon nanotubes) and zero-dimensional carbon (such as acetylene black carbon ball) may be combined in a form of point and lines to form a uniform electricity conducting network, which can effectively enhance the electrical conductivity of the inner region. In another preferred embodiment, the conductive agent in the inner region is a combination of a two-dimensional conductive carbon material and a zero-dimensional conductive carbon material. Two-dimensional carbon (such as flake conductive graphite) and zero-dimensional carbon (such as acetylene black carbon ball) may be combined in a form of points and surfaces to form a uniform electricity conducting network, which can effectively enhance the electrical conductivity of the inner region.

In a preferred embodiment of the present application, the electrode active material layer is divided into two regions in the thickness direction, i.e., an inner region and an outer region. Based on the total weight of the inner region of the electrode active material layer, the weight percentage of the binder in the inner region is 30%-99%, preferably 50%-99%, more preferably 80%-99%; the weight percentage of the conductive agent in the inner region is 1%-70%, preferably 1%-50%, more preferably 1%-20%. The balance is the electrode active material.

Due to the uneven distribution of the content of the binder, the content of the conductive agent and that of the active material in the electrode active material may also vary in the thickness direction.

A thickness H of the inner region of the electrode active material layer (which is a single-sided thickness in the case of double-layer coating) is preferably 0.1 µm-5 µm. A too small thickness of the inner region cannot effectively improve the safety regarding nail penetration. A too large thickness of the inner region not only reduces the gravimetric energy density of the battery, but also increases the DCR of the battery, which is not conducive to the improvement of dynamics performance of the battery.

In the positive plate according to some preferred embodiments of the present application, based on the total weight of the electrode active material layer of the outer region, the content of the binder in the electrode active material layer of the outer region is preferably not less than 1 wt %, more preferably not less than 1.5 wt %, most preferably not less than 2 wt %. For the electrode plate of the present application, when the content of the binder in the electrode active material layer in the outer region is high, the bonding force between the active material layer and the composite current collector can be further enhanced, to prevent the support layer from a high degree of rebound during the processing process to degrade the bonding force between the composite current collector and the electrode active material layer, thereby ensuring that the electrode active material layer is not easily separated from the composite current collector. If the bonding force between the two is insufficient, the battery will have a large internal resistance and increased polarization, resulting in poor electrochemical performance. In addition, the high bonding force enables the active material layer to effectively wrap the metal burrs generated in the conductive layer in abnormal situations such as nail penetration, so as to improve the safety performance regarding nail penetration of the battery. If the binder content is kept within this range, a strong bonding force is provided between the active material layer and the current collector, so that the active material layer can effectively wrap the metal burrs generated in the conductive layer in abnormal situations such as nail penetration, so as to improve the safety performance regarding nail penetration of the battery.

It should be noted that in the embodiment where the electrode active material layer is divided into two regions, i.e., an inner region and an outer region, in the thickness direction, the same or different electrode active materials, conductive agents, and binders may be used for the inner region and the outer region. The inner region preferably uses a conductive agent including a one-dimensional conductive carbon material and/or a two-dimensional conductive carbon material and an aqueous binder, as preferred in the present application, and the outer region may use the same or different conductive agents and binders. For the positive plate, the positive active material in the inner region may be the same as or different from the positive active material in the outer region. The positive active material in the inner region is preferably a material with high thermal stability, such as at least one of lithium iron phosphate, manganese phosphate lithium iron, lithium manganate, lithium manganese phosphate, NCM333, or NCM523.

The electrode active material layer in which the binder has an uneven distribution in the thickness direction can be prepared by a method known in the existing technology, for example, a multilayer coating method such as a two-layer coating method or a three-layer coating method, but the present application is not limited thereto.

In a conventional electrode plate, the electrode active material layer is generally uniformly coated in the to-be-coated region of the entire surface of the electrode plate, and the cold pressing (rolling) operation is also performed on the entire surface of the electrode plate. The resulting compaction density of the electrode active material layer on the electrode plate is also basically even, and there is no significant difference.

In the present application, since the support layer of the composite current collector is a polymer material or a polymer composite material, the degree of rebound of the support layer during the electrode plate processing (such as rolling and other processes) is greater than that of a conventional metal current collector. If the current collector is coated and then compacted by rolling based on a conventional process, a series of problems may be caused. Due to the rebound of the support layer, edges on two sides of the electrode will warp, and consequently the electrode plate is curved as a whole, resulting a deformation of the electrode plate. Deformation of the electrode plate may cause separation of the electrode active material layer from the composite current collector, breakage of the conductive layer, peeling of the conductive layer from the support layer, etc., deteriorating the electrochemical performance of the electrode plate. On the other hand, the deformation of the electrode plate also makes it impossible to precisely align the positive plate and negative plate. Therefore, the electrode plate prepared using the composite current collector is prone to technical problems such as large internal resistance and great polarization.

In the positive plate according to some preferred embodiments of the present application, viewed from a width direction of a coated surface of the positive plate, the electrode active material layer or the outer region of the electrode active material layer includes 2n+1 (n=1, 2, or 3) regions based on a compaction density, and a compaction density of a middle region is higher than compaction densities of two side regions; n is preferably 1.

Taking a preferred embodiment as an example, the outer region of the electrode active material layer includes three regions based on compaction densities, and a compaction density of a middle region is higher than compaction densities of two side regions. After cold pressing (rolling) and other processes, the compaction densities of the two side regions of the electrode are low, while the compaction density of the middle region is high. In other words, the two side regions of the electrode receive a smaller pressure than that received by the middle region during cold pressing (rolling) and other processes. Therefore, edge warpage and curvature of the composite current collector and the electrode plate that are likely to occur due to the rebound of the composite current collector during the electrode processing can be avoided, which is conducive to the formation of a electrode plate with flat surface, and therefore is beneficial to ensure the electrochemical performance of the electrochemical device. In addition, the conductive layer can be prevented from being easily damaged, thereby ensuring a good overcurrent capability of the electrode plate.

In the present application, the "length direction" and "width direction" of the surface of the electrode plate respectively refer to two dimensions of the surface, where the length direction refers to a major dimension direction (i.e., the direction with a larger size), and the width direction refers to a minor dimension direction (i.e., the direction with a smaller size). Generally, the length direction is consistent with the coating direction of each material layer (such as the electrode active material layer) during the electrode plate processing, and is also consistent with the winding direction of the electrode plate during the manufacturing process of an electrochemical device (such as a battery). The width direction is perpendicular to the length direction.

The three regions of the active material layer based on compaction densities according to the present application may be formed by a differential coating method. To be specific, baffles or spacers are used to define different regions (or boundaries) on the surface of the electrode plate, each region is coated with a different weight of the electrode active material slurry, followed by rolling, to form active material layer regions with different compaction densities. In addition, the compaction densities of the two side regions are preferably the same. Such a design can better ensure the flatness of the electrode plate.

Figure 7:
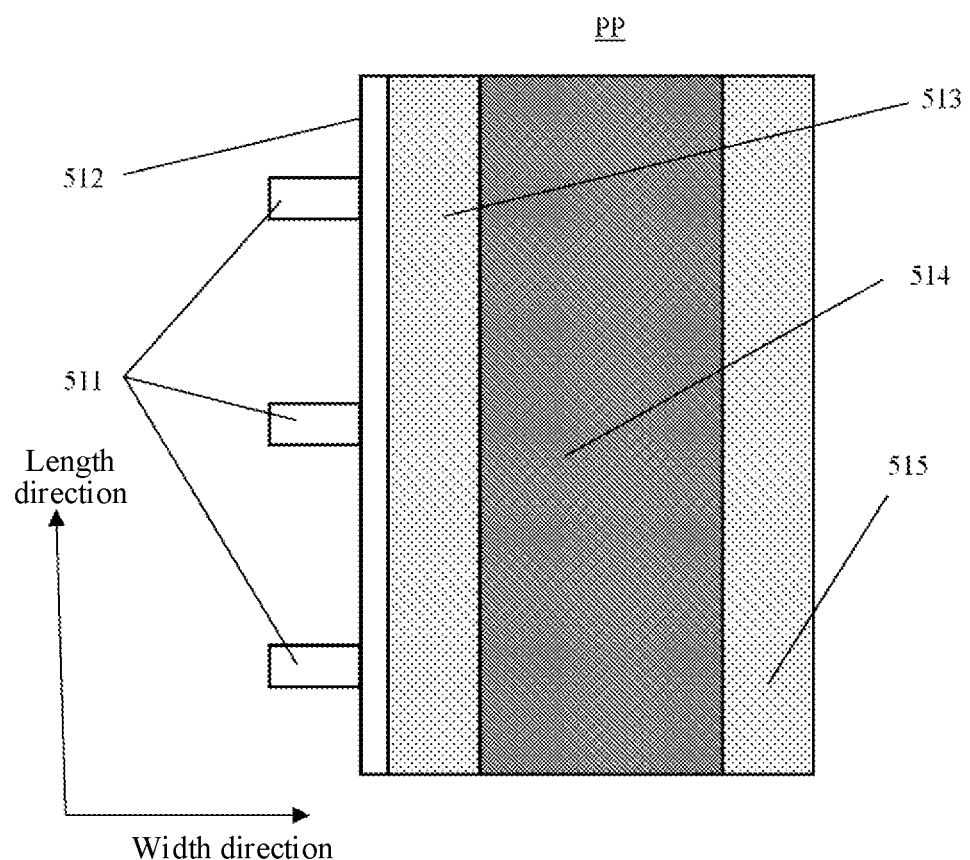
FIG. 7 is a structural schematic top view of a positive according to some specific embodiments of the present application.

FIG. 7 is a schematic structural top view of a positive plate according to some specific embodiments of the present application; The positive plate PP includes an electrode body and one or more electrode tabs 511 electrically connected to the electrode body. Depending on the different electrode active material layers coated, the electrode body includes four regions: an extension region 512 directly connected to the electrode tab 511 (which is the region not coated by the electrode active material layer), a first low compaction region 513, a high compaction region 514, and a second low compaction region 515. That is, viewed from the width direction of the coated surface of the positive plate PP, the outer region of the electrode active material layer includes three regions based on compaction densities. The compaction density of the middle region 514 is higher than the compaction densities of the two side regions 513 and 515.

In the present application, the ratio of the middle high compaction region to the total coated region (where this ratio is the ratio of the width of 514 to the sum of the widths of 513, 514, and 515 in this example) is, for example, 20-80%, preferably 30-70%, preferably 40-60%, or more preferably 45-55%. The widths of the two low compaction regions may be the same or different, and are preferably the same.

In the present application, the compaction density of the low compaction region may be lower than the compaction density of the high compaction region by about 5-30%, for example, 7-25%, for example, 8-20%, for example, 8-18%.

Positive Plate

The positive plate of the battery in the present application may be formed by a conventional method.

Figure 5:
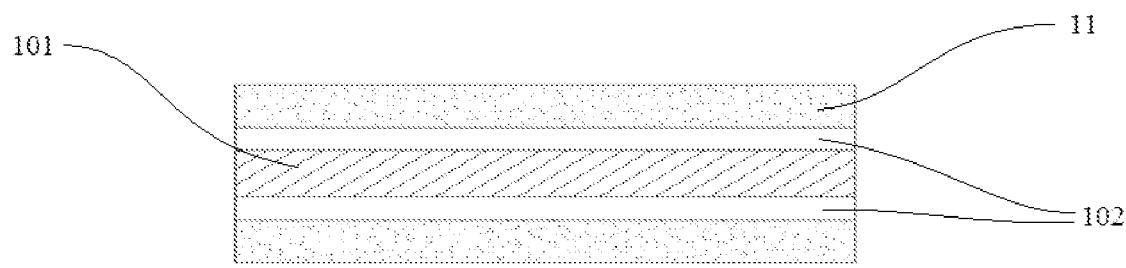
FIG. 5 is a structural schematic diagram of a positive according to a specific embodiment of the present application.
Figure 6:
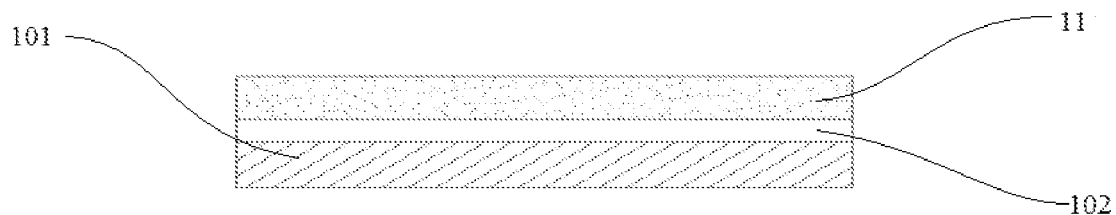
FIG. 6 is a structural schematic diagram of a positive according to another specific embodiment of the present application.

FIG. 5 and FIG. 6 are structural schematic diagrams of a positive plate according to some specific embodiments of the present application.

In FIG. 5, the positive plate includes a positive current collector 10 and positive active material layers 11 respectively arranged on two opposite surfaces of the positive current collector 10. The positive current collector 10 includes a positive current collector support layer 101, positive current collector conductive layers 102 respectively arranged on two opposite surfaces of the positive current collector support layer 101, and a positive protective layer 103 (not shown) arranged on one side or each of two sides of each of the positive conductive layers 102.

In FIG. 6, the positive plate includes a positive current collector 10 and a positive active material layer 11 arranged on one surface of the positive current collector 10. The positive current collector 10 includes a positive current collector support layer 101, a positive current collector conductive layer 102 arranged on one surface of the positive current collector support layer 101, and a positive protective layer 103 (not shown) arranged on one side or each of two sides of each of the positive conductive layers 102.

Those skilled in the art can understand that when a current collector with conductive layers on two sides thereof is used, both the two sides of the electrode plate may be coated (i.e., an electrode active material layer is arranged on each of the two surfaces of the current collector), or only one side of the electrode plate may be coated (i.e., an electrode active material layer is arranged on only one surface of the current collector); and when a current collector with a conductive layer on only one side thereof is used, only a single side of the electrode plate can be coated, and the electrode active material layer (and the primer coating of the adhesive layer) can be coated on only the side of the current collector where the conductive layer is provided.

Electrochemical Device of the Present Application

The electrochemical device in the application may be, for example, a battery, which may include the positive plate as described above, the separator, and the negative plate. The negative plate used in combination with the positive plate according to the present application may be any conventional negative plate commonly used in the existing technology, and the configuration and preparation method thereof are well-known in the existing technology. For example, the negative plate may include an anode current collector and an negative active material layer arranged on the anode current collector, and the negative active material layer may include an negative active material, a binder, a conductive material, and the like. The negative active material is, for example, a carbonaceous material such as graphite (artificial graphite or natural graphite), conductive carbon black or carbon fiber; a metal or semi-metal material such as such as Si, Sn, Ge, Bi, Sn, or In, or alloys thereof; a lithium-containing nitride or lithium-containing oxide; lithium metal or lithium aluminum alloy, etc. The anode current collector may be a conventional metal foil or a composite current collector.

The separator used in the battery of the present application may be any separator commonly used in the existing technology.

The battery of the present application usually further includes an electrolytic solution. Various electrolytic solutions commonly used in the existing technology may be used, such as a solution of an electrolyte salt in a non-aqueous solvent. For example, for a lithium battery, a mixed solution of an electrolyte lithium salt and a non-aqueous solvent may be used. The lithium salt electrolyte may be selected from one or more of lithium hexafluorophosphate (LiPF$_6$), lithium perchlorate, lithium tetrafluoroborate, lithium hexafluoroarsenate, lithium halide, lithium tetrachloroaluminate, or lithium fluoroalkylsulfonate. The organic solvent may be selected from chain carbonate, cyclic carbonate, or mixed solvents formed thereby. The chain carbonate may be at least one of dimethyl carbonate (DMC), diethyl carbonate (DEC), ethyl methyl carbonate (EMC), methyl propyl carbonate (MPC), dipropyl carbonate (DPC), or other chain organic esters containing fluorine, sulfur or unsaturated bonds. The cyclic carbonate may be at least one of ethylene carbonate (EC), propylene carbonate (PC), vinylene carbonate (VC), γ-butyrolactone (γ-BL), sultone, or other cyclic organic esters containing fluorine, sulfur or unsaturated bonds.

The battery of the present application may be a primary battery or a secondary battery. The battery of the present application may be a lithium-ion battery or a sodium ion battery, preferably a lithium-ion battery, and for example, may be a lithium-ion primary battery or a lithium-ion secondary battery. In addition to the use of the positive plate as described above, the structures and preparation methods of these batteries are known. Due to the use of the above-mentioned positive plate, the battery can have improved safety (for example, safety regarding nail penetration), energy density, and electrical performance. In addition, the positive plate according to the present application is easy to process, so the manufacturing cost of the battery using the positive plate according to the present application can be reduced.

In some embodiments, the electrochemical device may include an outer package for packaging the positive plate, the negative plate, and the electrolyte. As an example, the positive plate, the negative plate and the separator may be laminated or wound to form a laminated or wound electrode assembly. The electrode assembly is packaged in the outer package. The electrolyte may be an electrolytic solution, and the electrolytic solution is infiltrated in the electrode assembly. The number of electrode assemblies in the electrochemical device may be one or more, which can be adjusted according to requirements.

In some embodiments, the outer package of the electrochemical device may be a soft bag, such as a bag-type pouch. The material of the pouch may be plastic, and for example, may include one or more of polypropylene (PP), polybutylene terephthalate (PBT), or polybutylene succinate PBS. The outer package of the electrochemical device may also be a hard shell, for example, an aluminum shell.

Figure 8:
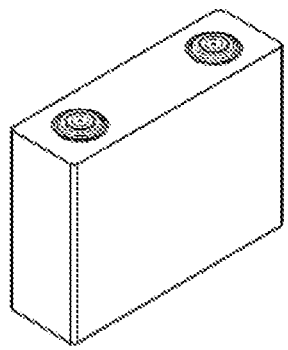
FIG. 8 is a schematic diagram of an embodiment of an electrochemical device of the present application.

The shape of the electrochemical device is not particularly limited in the present application, and may be cylindrical, square or any other shape. FIG. 8 shows an exemplary electrochemical device 5 with a square structure.

In some embodiments, the electrochemical device may be assembled into a battery module, and the number of electrochemical devices included in the battery module may be more than one. The specific number may be adjusted according to the application and capacity of the battery module.

Figure 9:
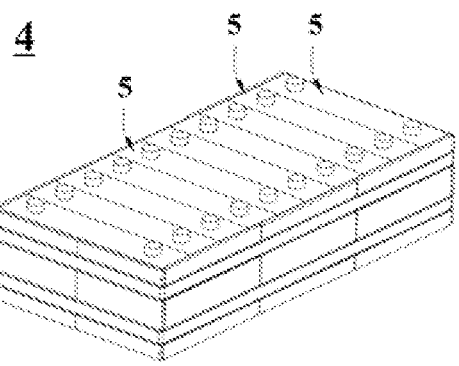
FIG. 9 is a schematic diagram of an embodiment of a battery module of the present application.

FIG. 9 shows an exemplary battery module 4. Referring to FIG. 9, in the battery module 4, a plurality of electrochemical devices 5 may be arranged in sequence along the length direction of the battery module 4. Of course, the electrochemical devices may also be arranged in any other manner. Further, the plurality of electrochemical devices 5 may be fixed by fasteners.

Optionally, the battery module 4 may further include a housing having an accommodation space, and the plurality of electrochemical devices 5 are accommodated in the accommodation space.

In some embodiments, the above-mentioned battery modules may also be assembled into a battery pack, and the number of battery modules included in the battery pack may be adjusted according to the application and capacity of the battery pack.

Figure 10:
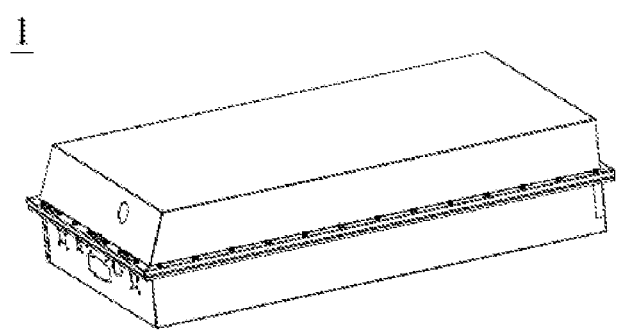
FIG. 10 is a schematic diagram of an embodiment of a battery pack of the present application.
Figure 11:
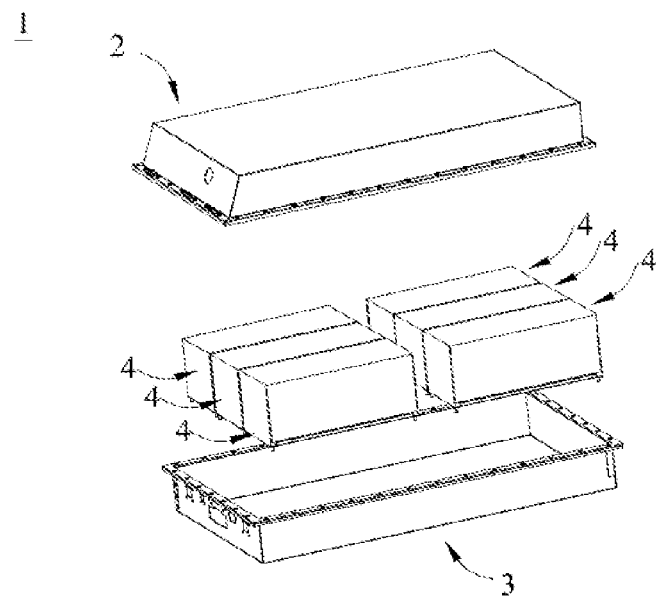
FIG. 11 is an exploded view of FIG. 10.

FIG. 10 and FIG. 11 show an exemplary battery pack 1. Referring to FIG. 10 and FIG. 11, the battery pack 1 may include a battery box and a plurality of battery modules 4 arranged in the battery box. The battery box includes an upper box body 2 and a lower box body 3. The upper box body 2 can cover on the lower box body 3 and form a closed space for accommodating the battery modules 4. The plurality of battery modules 4 may be arranged in the battery box in any manner.

Apparatus of the Present Application

According to a third aspect, the present application relates to an apparatus, including the electrochemical device according to the second aspect of the present application. The electrochemical device may be used as a power supply of the apparatus, or may be used as an energy storage unit of the apparatus. The apparatus may be, but is not limited to, a mobile device (such as a mobile phone, notebook computer, etc.), an electric vehicle (such as a pure electric vehicle, hybrid electric vehicle, plug-in hybrid electric vehicle, electric bicycle, electric scooter, electric golf vehicle, electric truck, etc.), an electric train, a ship, a satellite, an energy storage system, etc.

An electrochemical device, a battery module or a battery pack may be selected according to usage requirements of the apparatus.

Figure 12:
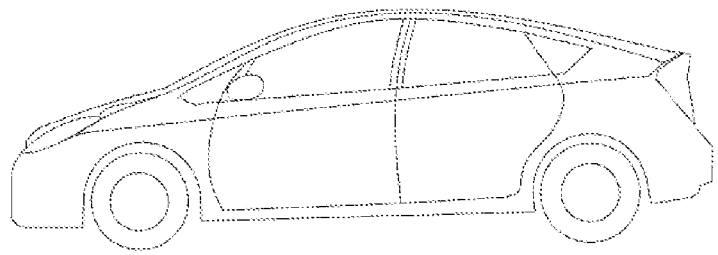
FIG. 12 is a schematic diagram of an embodiment of an apparatus of the present application, which uses an electrochemical device as a power supply.

FIG. 12 shows an exemplary apparatus. The apparatus is a pure electric vehicle, a hybrid electric vehicle, or a plug-in hybrid electric vehicle, etc. In order to meet the apparatus's requirements for high power and high energy density of electrochemical devices, a battery pack or battery module may be used.

As another example, the apparatus may be a mobile phone, a tablet computer, a notebook computer, etc. The apparatus is generally required to be thin and light, for which an electrochemical device may be used as a power supply.

Those skilled in the art can understand that the various limitations or preferred ranges for the component selection, component content, and physical and chemical performance parameters of materials in the electrochemically active material layer in the different embodiments of the present application mentioned above may be combined arbitrarily, and various embodiments obtained from such combination still fall within the scope of the present application and are regarded as part of the disclosure of this specification.

Unless otherwise specified, the various parameters involved in this specification have general meanings known in the art, and can be measured according to methods known in the art. For example, the test can be carried out according to the method given in the embodiments of the present application. In addition, the preferred ranges and options of various different parameters given in various preferred embodiments may be combined arbitrarily, and various combinations obtained therefrom are deemed to be within the scope of the disclosure of the present application.

The advantages of the present application will be further described below with reference to examples.

EXAMPLES

In order to make the objectives, technical solutions, and advantages of the present application clearer, the following further describes the present application in detail with reference to examples. However, it should be understood that the examples of the application are only for explaining the present application, not for limiting the present application, and the examples of the application are not limited to the examples given in this specification. In the examples, when experimental conditions are not specified, conventional conditions or the conditions recommended by material suppliers or equipment suppliers are adopted.

Methods for preparing the current collectors used in the positive plates in the examples and comparative examples are as follows.

1. Preparation of Current Collector without Protective Layer

A support layer of a certain thickness was selected, and a conductive layer of a certain thickness was formed on a surface of the support layer by vacuum evaporation, mechanical rolling, or bonding.

Herein:

(1) The formation conditions of the vacuum evaporation method are as follows: The support layer of which the surface has been cleaned is placed in a vacuum coating chamber. A high-purity metal wire in a metal evaporation chamber is melted and evaporated at a high temperature of 1600° C. to 2000° C. An evaporated metal is subjected to a cooling system in the vacuum coating chamber, and finally deposited on the surface of the support layer to form a conductive layer.

(2) The forming conditions of the mechanical rolling method are as follows: The conductive layer material foil is placed under a mechanical roller, rolled to a predetermined thickness by applying a pressure of 20t to 40t, and then placed on the surface of the support layer of which the surface has been cleaned. Finally the conductive layer material foil and the support layer are placed in a mechanical roller, and tightly combined with each other by applying a pressure of 30t to 50t.

(3) The formation conditions of the bonding method are as follows: The conductive layer material foil is placed under a mechanical roller, and rolled to a predetermined thickness by applying a pressure of 20t to 40t. The surface of the support layer of which the surface has been cleaned is coated with a mixed solution of PVDF and NMP. Finally, the conductive layer with the predetermined thickness is bonded to the surface of the support layer and dried at 100° C.

2. Preparation of Current Collector with Protective Layer

There are several ways to prepare a current collector with a protective layer as follows:

(1) First, a protective layer is formed on a surface of a support layer by vapor deposition or coating, and then a conductive layer with a certain thickness is formed on the surface of the support layer formed with the protective layer by vacuum evaporation, mechanical rolling or bonding, to prepare a current collector with a protective layer (where the protective layer is located between the support layer and the conductive layer). In addition, on the basis of the above, another protective layer may further be formed on the surface of the conductive layer facing away from the support layer by vapor deposition, in-situ formation or coating, to prepare a current collector with protective layers (where the protective layers are located on two opposite surfaces of the conductive layer).

(2) First, a protective layer is formed on one surface of a conductive layer by vapor deposition, in-situ formation or coating, and then the conductive layer formed with the protective layer is arranged on a surface of a support layer by mechanical rolling or bonding, here the protective layer is located between the support layer and the conductive layer, to prepare a current collector with a protective layer. In addition, on the basis of the above, another protective layer may further be formed on the surface of the conductive layer facing away from the support layer by vapor deposition, in-situ formation or coating, to prepare a current collector with protective layers (where the protective layers are located on two opposite surfaces of the conductive layer).

(3) First, a protective layer is formed on one surface of a conductive layer by vapor deposition, in-situ formation or coating, and then the conductive layer formed with the protective layer is arranged on a surface of a support layer by mechanical rolling or bonding, where the protective layer is arranged on the surface of the conductive layer facing away from the support layer, to prepare a current collector with a protective layer (where the protective layer is located on the surface of the conductive layer facing away from the support layer).

(4) First, a protective layer is formed on each of two surfaces of a conductive layer by vapor deposition, in-situ formation or coating, and then the conductive layer formed with the protective layer is arranged on a surface of a support layer, to prepare a current collector with protective layers (where the protective layers are located on two opposite surfaces of the conductive layer).

(5) On the basis of the above "Preparation of current collector without protective layer", another protective layer is formed on the surface of the conductive layer facing away from the support layer by vapor deposition, in-situ formation or coating, to prepare a current collector with a protective layer (where the protective layer is located on the surface of the conductive layer facing away from the support layer).

In a preparation example, the vapor deposition is vacuum evaporation, the in-situ formation is in-situ passivation, and the coating is blade coating.

The formation conditions of the vacuum evaporation method are as follows: The sample of which the surface has been cleaned is placed in a vacuum coating chamber. A protective layer material in an evaporation chamber is melted and evaporated at a high temperature of 1600° C. to 2000° C. The evaporated protective layer material is subjected to a cooling system in the vacuum coating chamber, and finally deposited on the surface of the sample to form a protective layer.

The formation conditions of the in-situ passivation are as follows: The conductive layer is placed in a high-temperature oxidizing environment, where the temperature is controlled at 160° C. to 250° C. and at the same time oxygen supply is maintained in the high-temperature environment; and treated for 30 min to form a protective layer of metal oxide.

The formation conditions of gravure coating are as follows: The protective layer material and NMP are stirred and mixed. Then the slurry of the protective layer material (with a solid content of 20% to 75%) is coated on the surface of the sample by using a gravure roller to control the thickness of coating, and finally dried at 100° C. to 130° C.

3. Preparation of Electrode Plates

1) Positive Plate of Example

A two-time coating method was used to form a positive plate with a lower positive active material layer (inner region) and an upper positive active material layer (outer region).

A conductive agent (such as conductive carbon black), a binder (such as PVDF or polyacrylic acid) and an optional positive active material at a certain ratio are dissolved in an appropriate solvent (such as NMP or water), and stirred evenly to form a primer coating slurry.

The primer coating slurry is evenly coated on two sides of a composite current collector prepared according to the above method at a coating speed of 20 m/min, and then the primer coating layer is dried in an oven at a temperature of 70-100° C. for 5 min.

After the primer coating layer is completely dried, 92 wt % of the positive active material, 5 wt % of the conductive agent Super-P ("SP" for short) and 3 wt % of PVDF are dissolved in NMP and stirred evenly to form an upper layer slurry. The upper layer slurry is coated on the surface of the dried primer coating layer by extrusion coating, which is then dried at 85° C. to obtain a positive active material layer.

Then the current collector with the coatings is cold pressed, cut, and then dried under vacuum at 85° C. for 4 hours, followed by welding of electrode tabs to obtain a positive plate.

2. Comparative Electrode Plate

The preparation method is similar to that of the positive plate of the above example, but the binder did not show an uneven distribution in the thickness direction, i.e., the upper layer slurry is directly coated on the surface of the composite current collector without forming the lower positive active material layer (primer coating).

3) Conventional Positive Plate

The current collector is an Al foil with a thickness of 12 μm. Similar to the preparation method of the comparative positive plate above, the upper layer slurry is directly coated on the surface of the Al foil current collector, and then post-treated to obtain a conventional positive plate.

4. Preparation of Negative Plate

Negative plate: An active material graphite, a conductive agent Super-P, a thickener CMC, and a binder SBR are added to deionized water at a mass ratio of 96.5:1.0:1.0:1.5 and mixed evenly to give a negative slurry. The negative slurry is coated on the surface of the negative current collector, i.e., the copper foil, and dried at 85° C., then trimmed, cut, slit, and dried at 110° C. under vacuum for 4 hours, followed by welding of electrode tabs, to prepare a satisfactory negative plate for a secondary battery.

5. Preparation of Electrolytic Solution

Ethylene carbonate (EC), ethyl methyl carbonate (EMC), and diethyl carbonate (DEC) are mixed at a volume ratio of 3:5:2 to obtain an EC/EMC/DEC mixed solvent. Then fully dried lithium salt $LiPF_6$ is dissolved in the mixed solvent to obtain a solution with a concentration of 1M, i.e., an electrolytic solution.

6. Preparation of Battery

A 12 μm polypropylene film was used as a separator. The positive plate, the separator and the negative plate are laminated in sequence so that the separator is between the positive plate and the negative plate for isolation, and then wound into a bare electrode assembly. The bare electrode assembly is baked at 75° C. under vacuum for 10 hours, into which an electrolytic solution (prepared as described in the "Preparation of electrolytic solution" above) is injected, followed by vacuum packaging, and standing for 24 hours. Then the electrode assembly is charged to 4.2 V with a constant current of 0.1 C, then charged at a constant voltage of 4.2 V until the current dropped to 0.05 C, and then discharged to 3.0 V with a constant current of 0.1 C. The charge and discharge processes are repeated twice, and finally the electrode assembly was charged to 3.8 V with a constant current of 0.1 C. Thus, the preparation of a secondary battery is completed.

7. Test Methods of Battery

1) Nail Penetration Test

At 25° C., a lithium-ion secondary battery is charged to 4.2 V at a constant current rate of 1 C, and then charged at a constant voltage until the current is less than or equal to 0.05 C. Afterward, a steel needle with a diameter of 8 mm is pierced through the entire lithium-ion secondary battery at a speed of 25 mm/s, and the steel needle is retained in the lithium-ion secondary battery to monitor the temperature and voltage changes of the lithium-ion secondary battery.

Battery temperature test: A temperature sensing line is attached to a needle surface and a geometric center on the back of the battery to be nailed, and then it is in contact with a multi-channel thermometer to monitor a temperature change of the battery after nail penetration. Next, a five-minute battery temperature tracking test is carried out. Then the battery temperature is recorded after five minutes to obtain a battery temperature rise.

Battery voltage test: The positive plate and negative plate of the battery to be nailed are connected to a measuring terminal of an internal resistance meter. After nail penetration, a five-minute battery voltage tracking test is carried out. Then the battery voltage is recorded after five minutes.

2) Method for Testing Internal Resistance of Nail-Penetration Short Circuit The electrode assembly is discharged to 3.2 V. A steel nail with a diameter of 3 mm is used to pierce through the electrode assembly at a speed of 80 mm/s, the Hall voltage (V) and Hall current (I) are monitored during piercing, and the real-time short-circuit resistance R=U/I is outputted.

3) Cycle Performance Test

At 45° C., the lithium-ion secondary battery is charged to 4.2 V at a constant current rate of 1 C, then charged at a constant voltage until the current is less than or equal to 0.05 C, and then discharged to 2.8 V at a constant current rate of 1 C, which is a charge and discharge cycle. The discharge capacity at this time is the discharge capacity of the first cycle. The lithium-ion secondary battery is subjected to 1000 cycles of charge and discharge according to the above method, and the discharge capacity of the $1000^{th}$ cycle is recorded.

Capacity retention rate (%) of lithium-ion secondary battery after 1000 cycles at 45° C. and 1 C/1 C=discharge capacity of the $1000^{th}$ cycle/discharge capacity of the first cycle×100%

4) Test Method of T Value

When the tensile strain of the positive current collector is 2.5%, the sheet resistance growth rate of the conductive layer is a T value. The T value may be tested according to the following method.

Assuming that the tensile strain of the positive current collector is ε (where ε is 2.5%), then ε=ΔL/L×100%, where ΔL is the elongation of the positive current collector after being stretched, and L is the original length of the positive current collector, i.e., the length of the positive current collector before being stretched.

When the tensile strain of the positive current collector is ε, the sheet resistance growth rate of the conductive layer is assumed to be T, and the T value may be measured by a method known in the existing technology. As an example, the positive current collector is cut into a sample of 20 mm×200 mm, and then the sheet resistance of the central region of the sample is measured by using a four-probe method, which is recorded as R1. Then the central region of the sample is stretched using a high-speed universal tensile testing machine. An initial position is set, and the sample between the clamps is made 50 mm long. Stretching is carried out at a speed of 50 mm/min. The stretch distance is the product of the original length L (50 mm) of the sample and ε, i.e., the stretch distance is ΔL. The stretched sample is removed, and the sheet resistance of the conductive layer between the clamps is measured, which is recorded as R2. According to a formula T=(R2−R1)/R1×100%, the sheet resistance growth rate T of the conductive layer when the tensile strain of the positive current collector is ε was calculated.

The method of measuring the sheet resistance of the conductive layer by using the four-probe method is as follows: An RTS-9 dual-electric measurement four-probe tester is used, and the test environment is: normal temperature 23±2° C., 0.1 MPa, relative humidity ≤65%. During the test, the surface of the sample to be tested is cleaned, and then the sample was placed horizontally on the test bench. The four probes are laid down so that the probes are in good contact with the surface of the conductive layer. Then an automatic test mode is adjusted to calibrate the current range of the sample, the sheet resistance is measured under a suitable current range, and 8 to 10 data points of the same sample are collected for analyzing the accuracy and error of data measurement. Finally, the data points are averaged to obtain a mean, which is recorded as the sheet resistance value of the conductive layer.

5) Test Method of DCR Growth Rate

At 25° C., the secondary battery is adjusted to 50% SOC with a current of 1 C, and a voltage U1 is recorded. Then the secondary battery is discharged for 30 seconds with a current of 4 C, and a voltage U2 is recorded. DCR=(U1−U2)/4 C. Then the battery is subjected to 500 cycles of charge and discharge at 1 C/1 C, and the DCR of the $500^{th}$ cycle is recorded. The DCR of the $500^{th}$ cycle is divided by the DCR of the first cycle, and the result is subtracted by 1 to obtain the DCR growth rate of the $500^{th}$ cycle.

8. Test Results and Discussion

8.1 Effects of the Positive Current Collector of the Present Application in Improving the Gravimetric Energy Density of the Electrochemical Device

TABLE 1

| No. | Support layer Material | $D_2$ μm | Conductive layer Material | $D_1$ μm | Positive current collector thickness μm | Weight percentage of positive current collector % |
|---|---|---|---|---|---|---|
| Positive current collector 91 | PET | 10 | Al | 0.5 | 11.0 | 50.0 |
| Positive current collector 92 | PI | 6 | Al | 0.3 | 6.6 | 30.0 |
| Positive current collector 93 | PI | 5 | Al | 1.5 | 8.0 | 45.8 |
| Positive current collector 94 | PET | 4 | Al | 0.9 | 5.8 | 31.7 |
| Positive current collector 95 | PI | 3 | Al | 0.2 | 3.4 | 16.7 |
| Positive current collector 96 | PI | 1 | Al | 0.4 | 1.8 | 10.8 |
| Conventional positive current collector | / | / | Al | / | 12.0 | 100 |

The weight percentage of the positive current collector refers to the percentage obtained by dividing the weight of the positive current collector per unit area by the weight of the conventional positive current collector per unit area.

Compared with the conventional positive current collector which is an aluminum foil, the weights of the positive current collectors of the present application are reduced to varying degrees, so that the gravimetric energy density of the battery can be improved.

8.2 Influence of the Thickness and Density of the Conductive Layer

For the sake of convenience, an electrode with no inner and outer regions (i.e., the content of the binder in the electrode active material layer is uniformly distributed in the thickness direction) is used for the study, but the conclusions drawn are also applicable to an electrode with inner and outer regions (i.e., the binder in the electrode active material layer has an uneven distribution in the thickness direction).

TABLE 2[#]

| | Conductive layer | | | | Support layer | | | | |
|---|---|---|---|---|---|---|---|---|---|
| No. | Material | $D_1$ μm | Density g/cm³ | Volume resistivity Ω·m | Material | $D_2$ μm | Volume resistivity Ω·m | E GPa | T % |
| Positive current collector 1 | Al | 2.0 | 2.6 | $3.7 \times 10^{-8}$ | PET | 10 | $2.1 \times 10^{14}$ | 4.2 | 3 |
| Positive current collector 2 | Al | 1.5 | 2.6 | $3.7 \times 10^{-8}$ | PET | 10 | $2.1 \times 10^{14}$ | 4.2 | 5 |
| Positive current collector 3 | Al | 1.2 | 2.7 | $2.7 \times 10^{-8}$ | PET | 10 | $2.1 \times 10^{14}$ | 4.2 | 0 |
| Positive current collector 4 | Al | 1.0 | 2.6 | $3.7 \times 10^{-8}$ | PET | 10 | $2.1 \times 10^{14}$ | 4.2 | 7 |
| Positive current collector 5 | Al | 0.9 | 2.5 | $5.5 \times 10^{-8}$ | PET | 10 | $2.1 \times 10^{14}$ | 4.2 | 53 |
| Positive current collector 6 | Al | 0.9 | 2.6 | $3.7 \times 10^{-8}$ | PI | 10 | $2.1 \times 10^{14}$ | 1.9 | 37 |
| Positive current collector 7 | Al | 0.9 | 2.7 | $2.7 \times 10^{-8}$ | PP | 10 | $2.1 \times 10^{14}$ | 2.2 | 0 |
| Positive current collector 8 | Al | 0.8 | 2.7 | $2.7 \times 10^{-8}$ | PPS | 10 | $2.1 \times 10^{14}$ | 4.0 | 0 |
| Positive current collector 9 | Aluminum alloy | 1.0 | 2.8 | $3.0 \times 10^{-8}$ | PET | 10 | $2.1 \times 10^{14}$ | 4.2 | 2 |
| Positive current collector 10 | Al | 0.6 | 2.6 | $3.7 \times 10^{-8}$ | PEN | 10 | $2.1 \times 10^{14}$ | 5.1 | 10 |
| Positive current collector 11 | Al | 0.5 | 2.6 | $3.7 \times 10^{-8}$ | PEN | 10 | $2.1 \times 10^{14}$ | 5.1 | 15 |
| Positive current collector 12 | Al | 0.3 | 2.6 | $3.7 \times 10^{-8}$ | PEN | 10 | $2.1 \times 10^{14}$ | 5.1 | 21 |
| Conventional positive current collector | Al | 12 | / | $2.8 \times 10^{-8}$ | / | / | / | / | / |

TABLE 2#-continued

| | Conductive layer | | | | Support layer | | | | |
|---|---|---|---|---|---|---|---|---|---|
| No. | Material | $D_1$ μm | Density g/cm$^3$ | Volume resistivity Ω·m | Material | $D_2$ μm | Volume resistivity Ω·m | E GPa | T % |
| Comparative positive current collector 1 | Al | 0.9 | 2.4 | $7.2 \times 10^{-8}$ | PET | 10 | $2.1 \times 10^{14}$ | 9.1 | 92 |
| Comparative positive current collector 2 | Aluminum alloy | 1.0 | 2.3 | $15.1 \times 10^{-8}$ | PET | 10 | $2.1 \times 10^{14}$ | 4.2 | 210 |

Aluminum alloy is aluminum alloy 7049 (aluminum-zinc alloy, from FinCOLA, US)

The positive current collectors in Table 2 are subjected to an overcurrent test. The positive current collector is cut into a width of 100 mm, and is coated with an 80 mm wide positive active material layer in the middle part thereof in the width direction and rolled into a positive. The electrode obtained by rolling is cut into strips of 100 mm×30 mm along the width direction. For each electrode, 10 strips are obtained by cutting. During the test, non-coated conductive regions on two sides of the electrode sample are respectively connected to positive and negative terminals of a charging/discharging machine. Then the charging/discharging machine is set to allow a 1.2 A current to flow through the electrode. If the electrode did not fuse after the current has been applied for 10 seconds, the electrode passed the test; otherwise, the electrode failed to pass the test. Five samples are tested in each group, and the results of the overcurrent test are shown in Table 3 below.

TABLE 3

| Positive plate No. | Positive current collector No. | Overcurrent test passing rate % |
|---|---|---|
| Positive plate 1 | Positive current collector 1 | 100 |
| Positive plate 2 | Positive current collector 2 | 100 |
| Positive plate 3 | Positive current collector 3 | 100 |
| Positive plate 4 | Positive current collector 4 | 100 |
| Positive plate 5 | Positive current collector 5 | 60 |
| Positive plate 6 | Positive current collector 6 | 70 |
| Positive plate 7 | Positive current collector 7 | 100 |
| Positive plate 8 | Positive current collector 8 | 100 |
| Positive plate 9 | Positive current collector 9 | 100 |
| Positive plate 10 | Positive current collector 10 | 100 |
| Positive plate 11 | Positive current collector 11 | 90 |
| Positive plate 12 | Positive current collector 12 | 80 |
| Conventional positive plate | Conventional positive current collector | 100 |
| Comparative electrode plate 1 | Comparative current collector 1 | 0 |
| Comparative electrode plate 2 | Comparative current collector 2 | 0 |

It can be seen from the data in Table 3 that when the density of the aluminum-based conductive layer of the positive current collector is not 2.5 g/cm$^3$-2.8 g/cm$^3$, the electrical performance of the positive current collector is poor. When the density of the aluminum-based conductive layer is 2.5 g/cm$^3$-2.8 g/cm$^3$, the electrical performance of the positive current collector is good, and the overcurrent test passing rate is significantly improved, which reached 100%.

8.3 Influence of the Protective Layer

For the sake of convenience, an electrode with no inner and outer regions (i.e., the content of the binder in the electrode active material layer is uniformly distributed in the thickness direction) is used for the study, but the conclusions drawn are also applicable to an electrode with inner and outer regions (i.e., the binder in the electrode active material layer has an uneven distribution in the thickness direction).

TABLE 4

| | Lower protective layer | | Upper protective layer | |
|---|---|---|---|---|
| No. | Material | $D_b$ (nm) | Material | $D_a$ (nm) |
| Positive current collector 4 | / | | / | / |
| Positive current collector 4-1 | / | | Nickel | 1 |
| Positive current collector 4-2 | / | | Nickel oxide | 10 |
| Positive current collector 4-3 | / | | Alumina | 50 |
| Positive current collector 4-4 | / | | Nickel oxide | 100 |
| Positive current collector 4-5 | Nickel | 5 | / | / |
| Positive current collector 4-6 | Alumina | 20 | / | / |
| Positive current collector 4-7 | Alumina | 80 | / | / |
| Positive current collector 4-8 | Nickel oxide | 100 | / | / |
| Positive current collector 4-9 | Nickel | 5 | Nickel | 10 |
| Positive current collector 4-10 | Nickel oxide | 8 | Nickel oxide | 10 |
| Positive current collector 4-11 | Alumina | 20 | Nickel oxide | 50 |
| Positive current collector 4-12 | Nickel oxide | 30 | Alumina | 50 |
| Positive current collector 4-13 | Alumina | 50 | Alumina | 100 |

In Table 4, the positive current collectors 4-1 to 4-13 are all obtained by arranging a protective layer based on the positive current collector 4.

TABLE 5

| Battery No. | Positive current collector No. | Capacity retention rate (%) after 1000 cycles at 45° C. and 1 C./1 C. |
|---|---|---|
| Conventional battery 1 | Conventional positive current collector | 86.5 |
| Battery 4 | Positive current collector 4 | 77.3 |
| Battery 4-1 | Positive current collector 4-1 | 78.1 |
| Battery 4-2 | Positive current collector 4-2 | 79.4 |
| Battery 4-3 | Positive current collector 4-3 | 79.9 |
| Battery 4-4 | Positive current collector 4-4 | 78.9 |
| Battery 4-5 | Positive current collector 4-5 | 78.2 |
| Battery 4-6 | Positive current collector 4-6 | 79.5 |
| Battery 4-7 | Positive current collector 4-7 | 80.6 |
| Battery 4-8 | Positive current collector 4-8 | 79.8 |
| Battery 4-9 | Positive current collector 4-9 | 81.8 |
| Battery 4-10 | Positive current collector 4-10 | 83.9 |
| Battery 4-11 | Positive current collector 4-11 | 87.1 |
| Battery 4-12 | Positive current collector 4-12 | 87.6 |
| Battery 4-13 | Positive current collector 4-13 | 87.3 |

The battery using the positive current collector of the present application, especially the battery prepared using the positive current collector with a protective layer, has a good cycle life. The capacity retention rate after 1000 cycles at 45° C. and 1 C/1 C is further improved, indicating an improved reliability of the battery.

8.4 Effect of the Composite Current Collector in Improving the Battery Safety Regarding Nail Penetration For the sake of convenience, an electrode with no inner and outer regions (i.e., the content of the binder in the electrode active material layer is uniformly distributed in the thickness direction) is used for the study, but the conclusions drawn are also applicable to an electrode with inner and outer regions (i.e., the binder in the electrode active material layer has an uneven distribution in the thickness direction).

TABLE 6

| | | Nail penetration test | |
|---|---|---|---|
| Battery No. | Positive current collector No. | Battery temperature rise (° C.) | Battery voltage (V) |
| Battery 1 | Positive current collector 1 | 31 | 3.71 |
| Battery 2 | Positive current collector 2 | 25 | 3.90 |
| Battery 3 | Positive current collector 3 | 21 | 3.85 |
| Battery 4 | Positive current collector 4 | 3 | 4.02 |
| Battery 5 | Positive current collector 5 | 7 | 3.85 |
| Battery 6 | Positive current collector 6 | 5 | 3.98 |
| Battery 7 | Positive current collector 7 | 13 | 3.6 |
| Battery 8 | Positive current collector 8 | 2 | 4.11 |
| Battery 9 | Positive current collector 9 | 9 | 4.09 |
| Battery 10 | Positive current collector 10 | 3 | 4.15 |
| Battery 11 | Positive current collector 11 | 2 | 4.21 |
| Conventional battery 1 | Conventional positive current collector | >500 | 0 |

The composite current collector can greatly improve the safety performance regarding nail penetration of the battery. It can be seen from the data in the table that for the battery using a conventional positive current collector, at the moment of nail penetration, the battery temperature rose by 500° C. and the voltage dropped to zero. This means that at the moment of nail penetration, an internal short circuit occurred in the battery, which led to the generation of much heat, resulting in thermal runaway and damage and thus failure of the battery. For the batteries using a composite current collector, in the nail penetration test, the battery temperature rise can be controlled at 35° C. or below, further 25° C. or below, and still further 10° C. or below, the battery voltage was basically stable, and the battery can work normally.

It can be seen that in the case of an internal short circuit in the battery, the composite current collector can greatly reduce the amount of heat generated due to the short circuit, thereby improving the safety performance of the battery. In addition, the damage of the battery caused by the short circuit can be limited to a "point", i.e., only a "point open circuit" is formed, and the normal operation of the electrochemical device within a certain period of time is not affected.

However, when a current collector with a high-density, thick conductive layer is used in order to improve the electrical conductivity and overcurrent capability of the current collector and the positive, the safety performance regarding nail penetration of the battery cannot reach an ideal state. In this case, the inner region and the outer region may be additionally provided to further improve the battery and ensure that the battery has good safety performance regarding nail penetration.

TABLE 7

| Positive plate No. | Positive current collector | Inner region (lower electrode active material layer) | Outer region (upper electrode active material layer) |
|---|---|---|---|
| Positive plate 3 | Positive current collector 3 | / | NCM333, D50 9.8 μm, active material layer thickness 55 μm |
| Positive plate 37 | Positive current collector 37* | / | Same as above |
| Positive plate 3-6-1 | Positive current collector 3 | Conductive carbon black 1%, aqueous polyacrylic acid 99%, thickness 1.5 μm | Same as above |
| Positive plate 3-6-2 | Positive current collector 3 | Conductive carbon black 5%, aqueous polyacrylic acid 95%, thickness 1.5 μm | Same as above |
| Positive plate 3-6-3 | Positive current collector 3 | Conductive carbon black 10%, aqueous polyacrylic acid 90%, thickness 1.5 μm | Same as above |
| Positive plate 3-6-4 | Positive current collector 3 | Conductive carbon black 20%, aqueous polyacrylic acid 80%, thickness 1.5 μm | Same as above |
| Positive plate 3-6-5 | Positive current collector 3 | Conductive carbon black 50%, aqueous PVDF 50%, thickness 1.5 μm | Same as above |
| Positive plate 3-6-6 | Positive current collector 3 | Conductive carbon black 65%, aqueous PVDF 35%, thickness 1.5 μm | Same as above |
| Positive plate 3-6-7 | Positive current collector 3 | Conductive carbon black 70%, aqueous polyacrylic acid 30%, thickness 1.5 μm | Same as above |
| Comparative positive plate 3-6-1 | Positive current collector 3 | Conductive carbon black 80%, aqueous PVDF 20%, thickness 1.5 μm | Same as above |
| Comparative positive plate 3-6-2 | Positive current collector 3 | Conductive carbon black 99%, aqueous PVDF 1%, thickness 1.5 μm | Same as above |
| Positive plate 3-6-8 | Positive current collector 3 | Conductive carbon black 50%, oily PVDF 50%, thickness 1.5 μm | Same as above |
| Positive plate 3-6-9 | Positive current collector 3 | Conductive carbon black 65%, oily PVDF 35%, thickness 1.5 μm | Same as above |
| Positive plate 3-6-10 | Positive current collector 3 | Conductive carbon black 25%, flake conductive graphite (D50 0.05 μm) 25%, aqueous PVDF 50%, thickness 1.5 μm | Same as above |
| Positive plate 3-6-11 | Positive current collector 3 | Conductive carbon black 25%, nanotubes 25%, aqueous PVDF 50%, thickness 1.5 μm | Same as above |
| Positive plate 3-6-12 | Positive current collector 3 | Conductive carbon black 50%, aqueous PVDF 50%, thickness 500 nm | Same as above |
| Positive plate 3-6-13 | Positive current collector 3 | Conductive carbon black 50%, aqueous PVDF 50%, thickness 2 μm | Same as above |
| Positive plate 3-6-14 | Positive current collector 3 | Conductive carbon black 50%, aqueous PVDF 50%, thickness 5 μm | Same as above |

TABLE 7-continued

| Positive plate No. | Positive current collector | Inner region (lower electrode active material layer) | Outer region (upper electrode active material layer) |
|---|---|---|---|
| Positive plate 3-6-15 | Positive current collector 3 Positive | Conductive carbon black 3%, LFP 2%, aqueous polyacrylic acid 95%, thickness 1.5 μm | Same as above |
| Positive plate 3-6-16 | Positive current collector 3 | Conductive carbon black 5%, NCM33 is 5%, aqueous polyacrylic acid 90%, thickness 1.5 μm | Same as above |

*Same as the positive current collector 3 except that the density of the conductive layer is 2.0 g/cm³

The test results are as follows.

TABLE 8

| Battery No. | Positive plate No. | Internal resistance of nail-penetration short circuit (Ω) | DCR growth rate |
|---|---|---|---|
| Battery 3 | Positive plate 3 | 1.5 | 34% |
| Battery 37 | Positive plate 37 | 1.6 | 40% |
| Battery 3-6-1 | Positive plate 3-6-1 | 2.1 | 33% |
| Battery 3-6-2 | Positive plate 3-6-2 | 1.89 | 31.6% |
| Battery 3-6-3 | Positive plate 3-6-3 | 1.75 | 30.9% |
| Battery 3-6-4 | Positive plate 3-6-4 | 1.6 | 29% |
| Battery 3-6-5 | Positive plate 3-6-5 | 1.3 | 20% |
| Battery 3-6-6 | Positive plate 3-6-6 | 1.26 | 15% |
| Battery 3-6-7 | Positive plate 3-6-7 | 1.2 | 14.7% |
| Comparative positive plate 3-6-1 | Comparative positive plate 3-6-1 | 1.12 | 14.5% |
| Comparative positive plate 3-6-2 | Comparative positive plate 3-6-2 | 1.03 | 14% |
| Positive plate 3-6-8 | Positive plate 3-6-8 | 1.4 | 22% |
| Positive plate 3-6-9 | Positive plate 3-6-9 | 1.3 | 18.5% |
| Positive plate 3-6-10 | Positive plate 3-6-10 | 1.39 | 19% |
| Positive plate 3-6-11 | Positive plate 3-6-11 | 1.3 | 16% |
| Positive plate 3-6-12 | Positive plate 3-6-12 | 1.35 | 19.5% |
| Positive plate 3-6-13 | Positive plate 3-6-13 | 1.28 | 18% |
| Positive plate 3-6-14 | Positive plate 3-6-14 | 1.25 | 17.2% |
| Positive plate 3-6-15 | Positive plate 3-6-15 | 1.95 | 31.9% |
| Positive plate 3-6-16 | Positive plate 3-6-16 | 1.87 | 31.3% |

8.5 Influence of the Coating Method of the Electrode Active Material Layer on the Electrode Plate Performance The following describes the influence of different coating methods of the active material layer on the electrode plate on the flatness of the electrode. Specifically, the flatness of the following three different types of positive plates is compared. In order to simplify the influencing factors, the electrode plate under comparison are electrode plates with no inner and outer regions (i.e., the content of the binder in the electrode active material layer is uniformly distributed in the thickness direction) is used for the study. Because the thickness of the inner region (generally 5 μm or less) is much smaller than the thickness of the outer region (generally 50 μm or more), the conclusions drawn are also applicable to an electrode with inner and outer regions (i.e., the binder in the electrode active material layer has an uneven distribution in the thickness direction).

1) Differentially Coated Positive Plate

The composite current collector used is prepared by vapor-depositing a 1 μm thick Al metal layer on each of two surfaces of a 10 μm PET.

92 wt % of the positive active material NCM333, 5 wt % of the conductive agent Super-P ("SP" for short) and 3 wt % of PVDF are dissolved in NMP and stirred evenly to form a positive active material layer slurry.

The two surfaces of the composite current collector are differentially coated by extrusion coating, and dried at 85° C., where the differential coating means that a high coating weight region is formed in the middle and a low coating weight region is formed at each of the two sides (which can be achieved by extruding a spacer or baffle). The width of the high coating weight region is 4 cm, and the widths of the low coating weight region is 2.1 cm.

Then the coated composite current collector is cold pressed, cut, and dried at 85° C. under vacuum for 4 hours, followed by welding of electrode tabs to obtain a positive plate.

The compaction density of the high coating weight region is 3.45 g/cm³, and the compaction density of the low coating weight region is 3.3 g/cm³.

Compaction density testing method: First, 30 small round current collectors with an area S are cut, of which the weights and thicknesses are measured. The weights and thicknesses are averaged to obtain an average weight $m_1$ and an average height $H_1$. Then 30 small round electrodes with an area S are cut, for which an average weight $m_2$ and an average height $H_2$ are calculated. Then, Compaction density=$(m_2-m_1)/((H_2-H_1)*S)$ 2) Uniformly Coated Comparative Positive Plate The current collector is also using the above-mentioned composite current collector prepared by plating Al on a 10 μm thick PET. The preparation method is similar to that of the positive plate described above, but the positive active material layer slurry is directly uniformly coated on the two surfaces of the composite current collector (i.e., differential coating is not adopted here), and then post-treated to obtain a uniformly coated comparative positive plate. The compaction density of the positive active material layer is 3.4 g/cm³.

3) Conventional Positive Plate

The current collector is a metal Al foil with a thickness of 12 μm. Similar to the preparation method of the comparative positive plate above, the positive active material layer slurry is directly uniformly coated on two surfaces of the Al foil current collector, and then post-treated to obtain a conventional positive plate.

The flatness of the above three different types of electrodes is measured. The electrode flatness test is characterized by measuring an arc height of the electrode relative to a reference plane. The specific method of measuring the arc height is as follows.

A 2 m long positive plate sample is taken. The sample is placed on a reference plane and unfolded along the width direction of the plane. The width of the plane is slightly smaller than the length of the electrode sample. Then two weights having the same mass (1 Kg) are respectively placed on the two sides of the sample to make the sample enter into close contact with the plane. Then a height by which the middle part of the sample projects from the plane is measured using a soft ruler, and the height measured is the arc height. In actual production, it is generally considered that an electrode plate with an arc height of less than or equal to 2 mm is flat, and when such electrode plates are assembled into a battery, the positive plate and negative plate can be precisely aligned.

The following table shows the specific measurement results.

TABLE 9

| Electrode | Arc height |
| --- | --- |
| Differentially coated positive plate | <2 mm |
| Uniformly coated comparative positive plate | >5 mm |
| Conventional positive plate | <2 mm |

It can be seen from the measurement results in the above table that the conventional positive plates using a metal current collector all met the requirements on the electrode flatness (i.e., the arc height needs to be less than or equal to 2 mm), which can achieve precise alignment during battery assembly. However, if the composite current collector is uniformly coated according to a conventional process but no additional treatment is performed, the arc height of the electrode would be relatively large (greater than 5 mm), leading to a poor electrode flatness, making it difficult to achieve precise alignment during battery assembly. After the differential coating process of the present application is adopted, the arc height is significantly reduced to a degree similar to that of the conventional electrode, and precise alignment during battery assembly can be achieved. This shows that the special design of differential coating of the active material layer can eliminate or reduce the possible edge warpage and curvature of the positive plate including the composite current collector after rolling, improve the electrode plate flatness, and achieve precise alignment during battery assembly, and also enables the battery to have excellent electrochemical performance and safety performance brought by the composite current collector.

Those skilled in the art can understand that although the above description is given by using a lithium-ion secondary battery as an example of the application of the electrode of the present application, the electrode of the present application can also be applied to other types of electrochemical devices and devices including such electrochemical devices to obtain the good technical effects of the present application.

Based on the disclosure and teachings of the foregoing specification, those skilled in the art to which the present application belongs can further change and modify the foregoing implementation. Therefore, the present application is not limited to the specific embodiments disclosed and described above, and some modifications and changes made to the present application should also fall within the protection scope of the claims of the present application. In addition, although some specific terms are used in this specification, these terms are only for the convenience of description and do not constitute any limitation on the present application.

What is claimed is:

1. A positive plate comprising a current collector and an electrode active material layer arranged on at least one surface of the current collector, wherein:
   the current collector comprises a support layer and a conductive layer arranged on at least one surface of the support layer, a single-sided thickness D2 of the conductive layer satisfies: 30 nm≤D2≤3 μm, a material of the conductive layer is aluminum or aluminum alloy, a density of the conductive layer is 2.5 g/cm³-2.8 g/cm³;
   the electrode active material layer comprises an electrode active material, a binder, and a conductive agent, the binder in the electrode active material layer has an uneven distribution in a thickness direction of the electrode active material layer, the electrode active material layer is divided in the thickness direction into an inner region and an outer region, and based on a total weight of the electrode active material layer, a weight percentage of the binder in the inner region of the electrode active material layer is higher than a weight percentage of the binder in the outer region of the electrode active material layer,
   wherein viewed from a width direction of a coated surface of the positive plate, the electrode active material layer or the outer region of the electrode active material layer comprises 2n+1 regions based on a compaction density, the 2n+1 regions comprises a middle region and at least two side regions, and a compaction density of the at least two side regions is lower than a compaction density of the middle region by 5% to 30% of the compaction density of the two side regions, a ratio of a width of the middle region to a sum of a width of each one of the 2n+1 regions is 30% to 70%.

2. The positive plate according to claim 1, wherein a material of the support layer is selected from at least one of an insulating polymer material, an insulating polymer composite material, a conductive polymer material, or a conductive polymer composite material;
   a thickness D1 of the support layer satisfies: 1 μm≤D1≤30 μm;
   a normal temperature Young's modulus E of the support layer satisfies: 20 GPa≥E≥4 GPa.

3. The positive plate according to claim 2, a thickness D1 of the support layer satisfies: 1 μm≤D1≤15 μm.

4. The positive plate according to claim 1, wherein the single-sided thickness D2 of the conductive layer satisfies: 300 nm≤D2≤2 μm.

5. The positive plate according to claim 4, wherein the single-sided thickness D2 of the conductive layer satisfies: 500 nm≤D2≤1.5 μm.

6. The positive plate according to claim 1, wherein a protective layer is further arranged on a surface of the conductive layer, and the protective layer is arranged on only one surface or two surfaces of the conductive layer of the current collector; and
   a thickness D3 of the protective layer satisfies: D3≤1/10 D2 and 1 nm≤D3≤200 nm.

7. The positive plate according to claim 1, wherein 10 nm≤D3≤50 nm.

8. The positive plate according to claim 6, wherein
   an upper protective layer is arranged on a surface of the conductive layer facing away from the supprot layer, a lower protective layer is arranged on a surface of the conductive layer facing the support layer, a thickness of the upper protective layer is $D_a$, where 1 nm≤$D_a$≤200 nm, and $D_a$≤0.1 D1; a thickness of the lower protective layer is $D_b$, where 1 nm≤$D_b$≤200 nm, and $D_b$≤0.1 D1; wherein $D_a$>$D_b$,
   the upper protective layer and the lower protective layer are selected from a metal layer or a metal oxide layer.

9. The positive plate according to claim 8, wherein 0.5 $D_a$≤$D_b$≤0.8 $D_a$, and the upper protective layer and the lower protective layer are metal oxide protective layers comprising at least one of the aluminum oxide, cobalt oxide, chromium oxide, or nickel oxide.

10. The positive plate according to claim 1, wherein based on the total weight of the electrode active material layer at the inner region, the weight percentage of the binder in the inner region is 30%-99%; the weight percentage of the conductive agent is 1%-70%; and the balance is the electrode active material.

11. The positive plate according to claim 10, wherein the weight percentage of the binder in the inner region is 50%-99%, the weight percentage of the conductive agent is 1%-50%.

12. The positive plate according to claim 11, wherein the weight percentage of the binder in the inner region is 80%-99%, the weight percentage of the conductive agent is 1%-20%.

13. The positive plate according to claim 1, wherein the conductive agent is at least one of a conductive carbon material or a metal material;
- the conductive carbon material is selected from at least one of acetylene black; conductive carbon black; one-dimensional conductive carbon; two-dimensional conductive carbon; or three-dimensional conductive carbon;
- the one-dimensional conductive carbon is carbon nanotube;
- the two-dimensional conductive carbon is selected from at least one of graphite and graphene;
- the three-dimensional conductive carbon is reduced graphene oxide;
- the metal material is selected from at least one of aluminum powder, iron powder, or silver powder;
- the binder is selected from at least one of styrene-butadiene rubber, oily polyvinylidene fluoride (PVDF), polyvinylidene fluoride copolymer, sodium carboxymethyl cellulose, polystyrene ethylene, polyacrylic acid, polytetrafluoroethylene, polyacrylonitrile, polyimide, aqueous PVDF, polyurethane, polyvinyl alcohol, polyacrylate, polyacrylic acid-polyacrylonitrile copolymer, or polyacrylate-polyacrylonitrile copolymer; and
- the binder in the electrode active material layer at the inner region is an aqueous binder.

14. The positive plate according to claim 13, wherein the binder in the electrode active material layer at the inner region is selected from at least one of aqueous PVDF, polyacrylic acid, polyurethane, polyvinyl alcohol, polyacrylate, polyacrylic acid-polyacrylonitrile copolymer, and polyacrylate-polyacrylonitrile copolymer.

15. The positive plate according to claim 13, wherein the conductive agent in the inner region of the electrode active material layer comprises at least one of the one-dimensional conductive carbon and the two-dimensional conductive carbon.

16. The positive plate according to claim 1, wherein a thickness H of the inner region is 0.1 μm-5 μm.

17. The positive plate according to claim 16, wherein the thickness H of the inner region is 0.1 μm-1.5 μm.

18. The positive plate according to claim 1, wherein n is 2 or 3.

19. The positive plate according to claim 18, wherein n is 2.

20. An electrochemical device comprising a positive plate, a negative plate, a separator, and an electrolytic solution, wherein the positive plate is the positive plate according to claim 1.

21. An apparatus comprising the electrochemical device according to claim 20.

22. The positive plate according to claim 1, wherein a weight percentage of the electrode active material in the inner region of the electrode active material layer is from 2% to 5%, based on a total weight of the inner region of the electrode active material layer.

23. The positive plate according to claim 1, wherein the inner region of the electrode active material layer is free from the electrode active material.

24. The positive plate according to claim 1, wherein the ratio of the width of the middle region to the sum of the width of each one of the 2n+1 regions is 40% to 60%.

* * * * *